(12) United States Patent
Ishii

(10) Patent No.: US 8,892,852 B2
(45) Date of Patent: Nov. 18, 2014

(54) BRANCH PREDICTION DEVICE AND METHOD THAT BREAKS ACCESSING A PATTERN HISTORY TABLE INTO MULTIPLE PIPELINE STAGES

(75) Inventor: Yasuo Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 1141 days.

(21) Appl. No.: 12/178,218

(22) Filed: Jul. 23, 2008

(65) Prior Publication Data

US 2009/0037709 A1 Feb. 5, 2009

(30) Foreign Application Priority Data

Jul. 31, 2007 (JP) ................................. 2007-199074

(51) Int. Cl.
*G06F 9/38* (2006.01)

(52) U.S. Cl.
CPC ............ *G06F 9/3848* (2013.01); *G06F 9/3844* (2013.01)
USPC ....................................... 712/240

(58) Field of Classification Search
None
See application file for complete search history.

(56) References Cited

U.S. PATENT DOCUMENTS

| | | | |
|---|---|---|---|
| 5,822,577 A | 10/1998 | Ekanadham et al. | |
| 5,978,906 A | 11/1999 | Tran | |
| 6,108,774 A | 8/2000 | Muthusamy | |
| 6,154,833 A * | 11/2000 | Murty et al. | 712/238 |
| 6,279,105 B1 * | 8/2001 | Konigsburg et al. | 712/238 |
| 2002/0199091 A1 * | 12/2002 | Tago et al. | 712/240 |
| 2005/0132175 A1 * | 6/2005 | Henry et al. | 712/239 |
| 2005/0149710 A1 | 7/2005 | Hikichi | |
| 2006/0200655 A1 * | 9/2006 | Smith et al. | 712/238 |
| 2006/0218385 A1 * | 9/2006 | Smith et al. | 712/238 |
| 2007/0294518 A1 * | 12/2007 | Wang | 712/238 |
| 2008/0005543 A1 * | 1/2008 | Rychlik | 712/239 |
| 2008/0109644 A1 | 5/2008 | Stempel et al. | |
| 2008/0256347 A1 * | 10/2008 | Eickemeyer et al. | 712/240 |

FOREIGN PATENT DOCUMENTS

| | | |
|---|---|---|
| JP | H10-40104 | 2/1998 |
| JP | 2001184207 A | 7/2001 |
| JP | 2001521241 A | 11/2001 |
| JP | 2001527233 A | 12/2001 |
| JP | 2003005956 A | 1/2003 |

(Continued)

OTHER PUBLICATIONS

Andre Seznec et al., "Design Tradeoffs for the Alpha EV8 Conditional Branch Predictor", 29th EIII—ACM International Symposium on Computer Architecture, May 25-29, 2002, Archorage, AK., pp. 1-12.

(Continued)

*Primary Examiner* — Jacob A Petranek
(74) *Attorney, Agent, or Firm* — Sughrue Mion, PLLC

(57) ABSTRACT

A branch prediction device capable of preventing degradation of branch prediction accuracy and a delay in processing speed is provided. The branch prediction device includes a branch prediction information accumulation processing section which stores branch prediction groups in which a plurality of pieces of branch prediction information are grouped, and performs accumulation-processing of the branch prediction information. The branch prediction device further includes a pipeline access control section which performs processing, upon request, by pipeline processing, including first selection control processing for selection-controlling at least one branch prediction group from the branch prediction groups, and second selection control processing for selection-controlling one or a plurality of pieces of branch prediction information from the branch prediction group, and controls an access to the branch prediction information accumulation processing section.

10 Claims, 15 Drawing Sheets

(56) References Cited

FOREIGN PATENT DOCUMENTS

| JP | 2008217687 A | 9/2008 |
|----|--------------|--------|
| JP | 2010509680 A | 3/2010 |
| WO | 2004068337 A1 | 12/2004 |
| WO | 2006028555 A2 | 3/2006 |

OTHER PUBLICATIONS

Japanese Office Action for JP2007-199074 mailed on Jun. 19, 2012.

Andre Seznec, Stephaen Felix, Venkata Krishnan, Yiannakis Sazeides, "Desin Tradeoffs for the Alpha EV8 Conditional Branch Predictor", Proceedings of 29th Annual International Symposium on Computer Architecture, IEEE, 2002, pp. 295-306.

Quinn Jacobson, Eric Rotenberg, James E. Smith, "Path-Based Next Trace Prediction", Proceedings of Thrtieth Annual IEE/ACM International Symposium on Microarchitecture, IEEE, 1997, pp. 14-23.

Yasuo Ishii, Kei Hiraki, "Path Branch Prediction", Journal of Information Processing, Information Processing Society of Japan, Mar. 15, 2006, vol.47, No. SIG3(ACS13), pp. 58-72.

* cited by examiner

FIG. 4

PROCESSOR PIPELINE PROCESSING

| | T1=0 | T1=1 | T1=2 | T1=3 | T1=4 | T1=5 | T1=6 | T1=7 | T1=8 | T1=9 | T1=10 |
|---|---|---|---|---|---|---|---|---|---|---|---|
| 110 | 110F FETCH STAGE | 110D DECODE STAGE | 110OP OPERAND READ STAGE | 110EX EXECUTION STAGE | 110MA MEMORY ACCESS STAGE | 110WR WRITE BACK STAGE | 110CO COMMIT STAGE | 110RE RETIRE STAGE | | | |
| 120 | | 120F FETCH STAGE | 120D DECODE STAGE | 120OP OPERAND READ STAGE | 120EX EXECUTION STAGE | 120MA MEMORY ACCESS STAGE | 120WR WRITE BACK STAGE | 120CO COMMIT STAGE | 120RE RETIRE STAGE | | |
| 130 | | | 130F FETCH STAGE | 130D DECODE STAGE | 130OP OPERAND READ STAGE | 130EX EXECUTION STAGE | 130MA MEMORY ACCESS STAGE | 130WR WRITE BACK STAGE | 130CO COMMIT STAGE | 130RE RETIRE STAGE | |
| 140 | | | | 140F FETCH STAGE | 140D DECODE STAGE | 140OP OPERAND READ STAGE | 140EX EXECUTION STAGE | 140MA MEMORY ACCESS STAGE | 140WR WRITE BACK STAGE | 140CO COMMIT STAGE | 140RE RETIRE STAGE |

FIG. 5

PIPELINE PROCESSING REGARDING
ACCESS TO PATTERN HISTORY TABLE

| | T2=-2 | T2=-1 | T2=0 | T2=1 | T2=2 |
|---|---|---|---|---|---|
| 210 | 210CA BRANCH COMMAND 1 PATTERN HISTORY TABLE ROW ACCESS | 210RA BRANCH COMMAND 1 PATTERN HISTORY TABLE COLUMN ACCESS | 210G BRANCH COMMAND 1 BRANCH PREDICTION RESULT GENERATION | | |
| 220 | | 220CA BRANCH COMMAND 2 PATTERN HISTORY TABLE ROW ACCESS | 220RA BRANCH COMMAND 2 PATTERN HISTORY TABLE COLUMN ACCESS | 220G BRANCH COMMAND 2 BRANCH PREDICTION RESULT GENERATION | |
| 230 | | | 230CA BRANCH COMMAND 3 PATTERN HISTORY TABLE ROW ACCESS | 230RA BRANCH COMMAND 3 PATTERN HISTORY TABLE COLUMN ACCESS | 230G BRANCH COMMAND 3 BRANCH PREDICTION RESULT GENERATION |

FIG.13

| | T2=-3 | T2=-2 | T2=-1 | T2=0 | T2=1 | T2=2 | T2=3 |
|---|---|---|---|---|---|---|---|
| 610 | 610CA BRANCH COMMAND 1 PATTERN HISTORY TABLE ROW ACCESS | 610RAI BRANCH COMMAND 1 PATTERN HISTORY TABLE FIRST COLUMN SELECTION | 610RAII BRANCH COMMAND 1 PATTERN HISTORY TABLE SECOND COLUMN | 610G BRANCH COMMAND 1 BRANCH PREDICTION RESULT GENERATION | | | |
| 620 | | 620CA BRANCH COMMAND 2 PATTERN HISTORY TABLE ROW ACCESS | 620RAI BRANCH COMMAND 2 PATTERN HISTORY TABLE FIRST COLUMN SELECTION | 620RAII BRANCH COMMAND 2 PATTERN HISTORY TABLE SECOND COLUMN | 620G BRANCH COMMAND 2 BRANCH PREDICTION RESULT GENERATION | | |
| 630 | | | 630CA BRANCH COMMAND 3 PATTERN HISTORY TABLE ROW ACCESS | 630RAI BRANCH COMMAND 3 PATTERN HISTORY TABLE FIRST COLUMN SELECTION | 630RAII BRANCH COMMAND 3 PATTERN HISTORY TABLE SECOND COLUMN | 630G BRANCH COMMAND 3 BRANCH PREDICTION RESULT GENERATION | |
| 640 | | | | 640CA BRANCH COMMAND 4 PATTERN HISTORY TABLE ROW ACCESS | 640RAI BRANCH COMMAND 4 PATTERN HISTORY TABLE FIRST COLUMN SELECTION | 640RAII BRANCH COMMAND 4 PATTERN HISTORY TABLE SECOND COLUMN | 640G BRANCH COMMAND 4 BRANCH PREDICTION RESULT GENERATION |

FIG.14

CASE OF NOT PERFORMING PIPELINE PROCESSING

| BRANCH COMMAND 1 PATTERN HISTORY TABLE ROW ACCESS | BRANCH COMMAND 1 PATTERN HISTORY TABLE COLUMN ACCESS | BRANCH COMMAND 1 PBRANCH PREDICTION RESULT GENERATION | BRANCH COMMAND 2 PATTERN HISTORY TABLE ROW ACCESS | BRANCH COMMAND 2 PATTERN HISTORY TABLE COLUMN ACCESS | BRANCH COMMAND 2 PBRANCH PREDICTION RESULT GENERATION | BRANCH COMMAND 3 PATTERN HISTORY TABLE ROW ACCESS | BRANCH COMMAND 3 PATTERN HISTORY TABLE COLUMN ACCESS | BRANCH COMMAND 3 PBRANCH PREDICTION RESULT GENERATION |

BRANCH PREDICTION DEVICE AND METHOD THAT BREAKS ACCESSING A PATTERN HISTORY TABLE INTO MULTIPLE PIPELINE STAGES

CROSS-REFERENCE TO RELATED APPLICATION

This application is based upon and claims the benefit of priority from Japanese patent application No. 2007-199074, filed on Jul. 31, 2007, the disclosure of which is incorporated herein in its entirety by reference.

BACKGROUND OF THE INVENTION

1. Field of the Invention

The present invention relates to a branch prediction device, a hybrid branch prediction device, a processor, a branch prediction method, and a branch prediction control program.

2. Related Art

Branch prediction in computer architecture is a function provided in a processor for predicting whether or not a condition branch command branches in a program executing procedure. The processor fetches and executes a command by the branch prediction function before it is actually determined whether or not branching is performed. Particularly, branch prediction is required in a pipelining processor because commands are fetched sequentially in order not to interrupt the pipeline.

As related art of branch prediction devices for performing such branch prediction, first related art (Andre Seznec et al, "Design Tradeoffs for the Alpha EV8 Conditional Branch Predictor" to appear in proceedings of the 29th IEEE-ACM International Symposium on Computer Architecture, 25-29 May 2002, Anchorage, Non-Patent Document 1), and second related art (JP 2003-5956 A, Patent Document 1) have been known.

The first related art discloses an exemplary configuration of a branch prediction device of an active branch prediction system, which is shown in FIG. 15. FIG. 15 is a block diagram showing an example of the first related art of a branch prediction device.

In a branch prediction device 700 shown in FIG. 15, a branch prediction result is generated using the readout results of pattern history tables 720-1, 720-2, and 720-3. Specifically, index information of the pattern history tables 720-1, 720-2, and 720-3 is generated using hash logic circuits 710-1, 710-2, and 710-3 (see pp. 7-8 in Non-Patent Document). In FIG. 15, the hash logic circuits 710-1, 710-2, and 710-3 carry out a hashing operation according to global branch history information from a global branch history 702 (information storing unit) and a branch command address corresponding to an subject command from a command counter 740.

The branch prediction device 700 of the first related art configures a hybrid branch prediction device of "2Bc-gskew" type which outputs the final branch prediction result through selection by a prediction result generation logic 730 from among branch prediction results by multiple types of tables including the pattern history table 720-1 (Meta: global branch prediction device), the pattern history table 720-2 (G1: "e-gskew" type branch prediction device), the pattern history table 720-3 (G1: "e-gskew" type branch prediction device), and the pattern history table 720-3 (BIM: bimodal branch prediction device).

In the second related art (Patent Document 1), a branch prediction device includes an XOR circuit as a hash logic circuit immediately preceding a tagged PHT (Pattern History Table) unit which is a pattern history table (see FIG. 2 of Patent Document 1). The XOR circuit calculates XOR of the branch command address to be executed shown by a program counter and the content of a GHR unit. The GHR (Global History Register) unit is a register which records the history regarding whether or not recently executed branch commands were branched. The calculated XOR is supplied to the tagged PHT (Pattern History Table) unit as an index. The tagged PHT unit is a RAM which stores a tag and a count value with respect to each index which is an output of the XOR circuit. If the count value is 0 or 1, it is predicted not to branch, and if the count value is 2 or 3, it is predicted to branch.

However, in both of the first related art and the second related art, as a hash logic circuit is provided immediately before a pattern history table, there has been a problem that a delay in processing of branch prediction will become worse when an access to the pattern history table is performed, which lowers the processing speed of the processor.

Further, in the branch prediction device of the first related art, when hash logic circuits 710-1, 710-2 and 710-3 perform operations according to a branch command address from a command counter 740, the branch command address from the command counter 740 is not known until immediately before the fetch stage. As such, operations by the hash logic circuits 710-1, 710-2 and 710-3 cannot be performed in advance prior to the fetch stage of the processor pipeline processing. In this way, presence of the hash logic circuits 710-1, 710-2 and 710-3 impede a higher processing speed.

Additionally, if complicated hash logic operations are performed by the hash logic circuits 710-1, 710-2 and 710-3 according to the branch command address when the address has become known after starting the fetch stage of the processor pipeline processing, the arithmetic processing takes time. As such, a delay in the operations by the hash logic circuits causes a delay in branch prediction including an accessing process to the pattern history tables, leading to a delay of the fetch stage itself, and to a delay of the processor, consequently. As delays in branch prediction include delays of the hash logic circuits 710-1, 710-2 and 710-3, a clock cycle of the entire processor is limited due to the delay in branch prediction, which adversely affects the processing speed of the processor.

SUMMARY OF THE INVENTION

It is an exemplary object of the invention to provide a branch prediction device, a hybrid branch prediction device, a processor, a branch prediction method, and a branch prediction control program, capable of preventing a delay in branch prediction which might adversely affect the processing speed of a processor, without providing a hash logic circuit immediately before a pattern history table.

A branch prediction device according to the exemplary aspect of the invention includes: a branch prediction information accumulation processing section which stores branch prediction groups in which pieces of branch prediction information regarding branch commands are grouped, and accumulation-processes the branch prediction information; and a pipeline access control section which performs, upon request, through pipeline processing, processing including first selection control processing for selection-controlling at least one branch prediction groups from the branch prediction groups, and second selection control processing for selection-controlling one or a plurality of pieces of the branch prediction information from the branch prediction group selected by the first selection control processing, and controls an access to the branch prediction information accumulation processing section.

A hybrid branch prediction device according to another exemplary aspect of the invention: a pipelined branch history information accumulation processing unit including a branch prediction information accumulation processing section which stores branch prediction groups in which a plurality of pieces of branch prediction information regarding branch commands are grouped and accumulation-processes the branch prediction information, and capable of accessing the branch prediction information accumulation processing section by pipeline processing; a first index information control unit for controlling an access by the pipeline processing by index information for selecting the branch prediction information or the branch prediction group, and performing processing at a fetch stage of the processor pipeline; and a second index information control unit for controlling the index information and performing processing at a commit stage of the processor pipeline. The pipelined branch prediction information accumulation processing unit includes: a first selection control section which controls selection-processing of at least one branch prediction group from the branch prediction groups; a second selection control section which controls selection-processing of one or a plurality of pieces of branch prediction information from the branch prediction groups selected by the first selection control section; and a prediction result generation section which generation-processes a branch prediction result according to the branch prediction information selected by the second selection control section. The first index information control unit controls pipeline processing for processing including first selection control processing by the first selection control section, second selection control processing by the second selection control section, and prediction result generation processing by the prediction result generation section.

A processor according to still another exemplary aspect of the invention includes a plurality of processor pipeline processing devices which perform processor pipeline processing for sequential transition of respective stages according to a command; the branch prediction device or the hybrid branch prediction device which performs branch prediction of branch commands in the processor pipeline processing; and a control device which controls the respective devices.

A branch prediction method according to still another exemplary aspect of the invention is a method in which a branch prediction device, which performs branch prediction regarding branch commands, generates a branch prediction result regarding the branch commands and performs branch prediction while referring to a branch prediction information accumulation processing section which stores branch prediction groups in which a plurality of pieces of branch prediction information regarding branch commands are grouped, and performs accumulation processing of the branch prediction information. The method includes first selection control processing, regarding at least one of the branch commands, for selection-controlling any one of the branch prediction groups of the branch prediction information accumulation processing section, second selection control processing for selection-controlling one or a plurality of pieces of branch prediction information from the branch prediction group selected in the first selection control processing, and branch prediction result generation processing for generating a branch prediction result regarding the branch command according to the branch prediction information selected in the second selection control processing. In the method, pipeline processing is performed regarding each branch command for the first selection control processing, the second selection control processing, and the branch prediction result generation processing.

A branch prediction control program according to still another exemplary aspect of the invention is a program in which a branch prediction device, which performs branch prediction regarding branch commands, generates a branch prediction result regarding branch commands and performs branch prediction while referring to a branch prediction information accumulation processing section which stores branch prediction groups in which a plurality of pieces of branch prediction information regarding branch commands are grouped, and performs accumulation-processing of the branch prediction information. The program causes the branch prediction device to perform processing including first selection control processing, regarding at least one of the branch commands, for selection-controlling any one of the branch prediction groups of the branch prediction information accumulation processing section, second selection control processing for selection-controlling one or a plurality of pieces of branch prediction information from the branch prediction group selected in the first selection control processing, and branch prediction result generation processing for generating a branch prediction result regarding the branch command according to the branch prediction information selected in the second selection control processing, and to cause the branch prediction device to perform, regarding each of the branch commands, pipeline processing for the first selection control processing, the second selection control processing and the branch prediction result generation processing.

The effects and advantages of the invention will be apparent from the description of exemplary embodiments shown below.

BRIEF DESCRIPTION OF THE DRAWINGS

FIG. 4 illustrates a pipeline structure of a processor including the branch prediction device of FIG. 2;

FIG. 5 illustrates a pipeline structure of accessing pattern history tables in the branch prediction device in FIG. 2;

FIG. 13 illustrates a pipeline structure for accessing pattern history tables in a branch prediction device according to another exemplary embodiment of the invention;

FIG. 14 illustrates an comparative example of the case of not performing pipeline processing in a branch prediction device.

DESCRIPTION OF EXEMPLARY EMBODIMENTS

The exemplary embodiments shown below do not unreasonably restrict the invention defined in the scope of the claims of the present invention. Further, not all of the configurations described in the exemplary embodiments are indispensable constituent features of the present invention.

Hereinafter, examples of exemplary embodiments of the present invention will be specifically described with reference to the drawings.

First Exemplary Embodiment

First, the schematic configuration of a branch prediction device according to the present invention will be described, followed by the detailed description thereof.
(Schematic Configuration of Branch Prediction Device)

Figure 1:
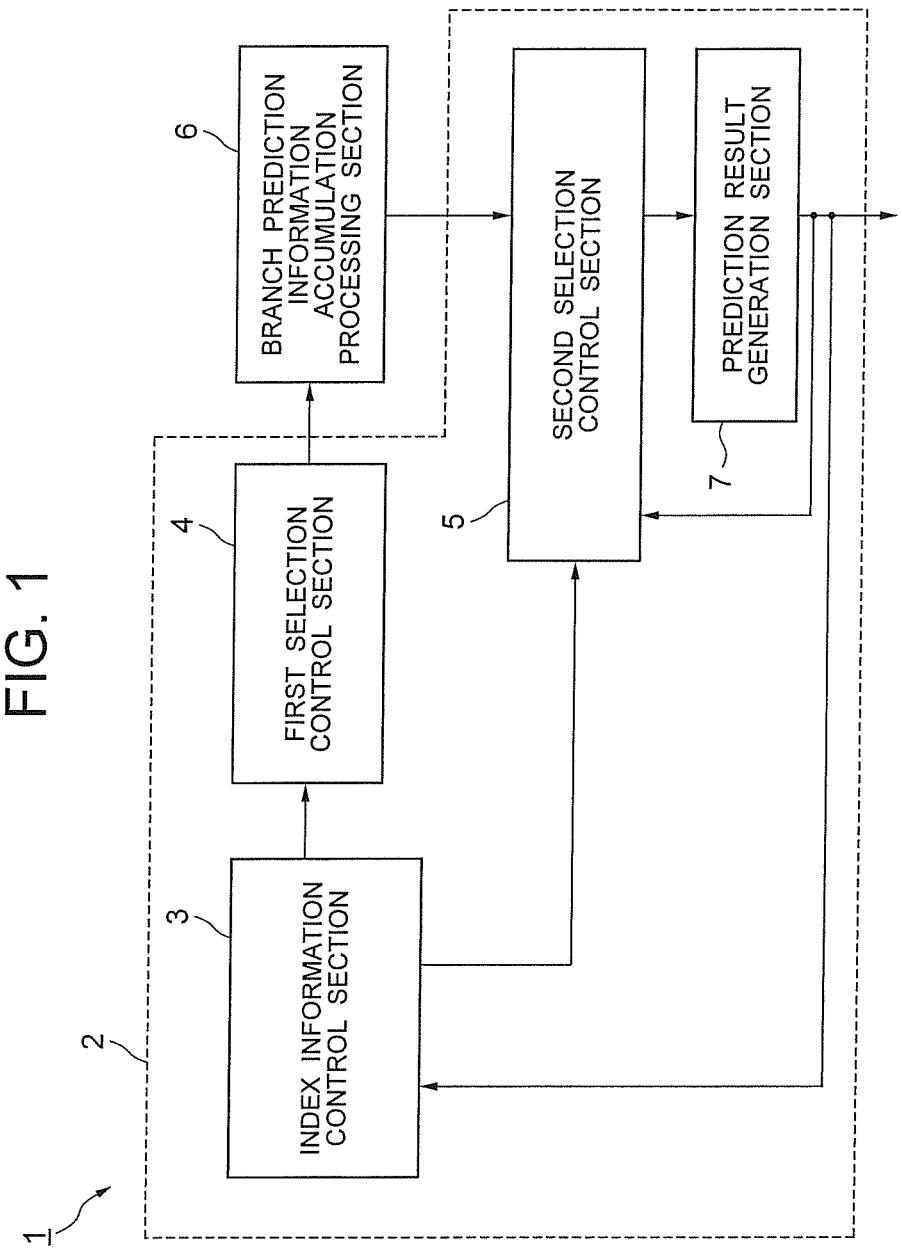
FIG. 1 is a block diagram showing an exemplary configuration of a branch prediction device according to a first exemplary embodiment of the invention.
Figure 6:
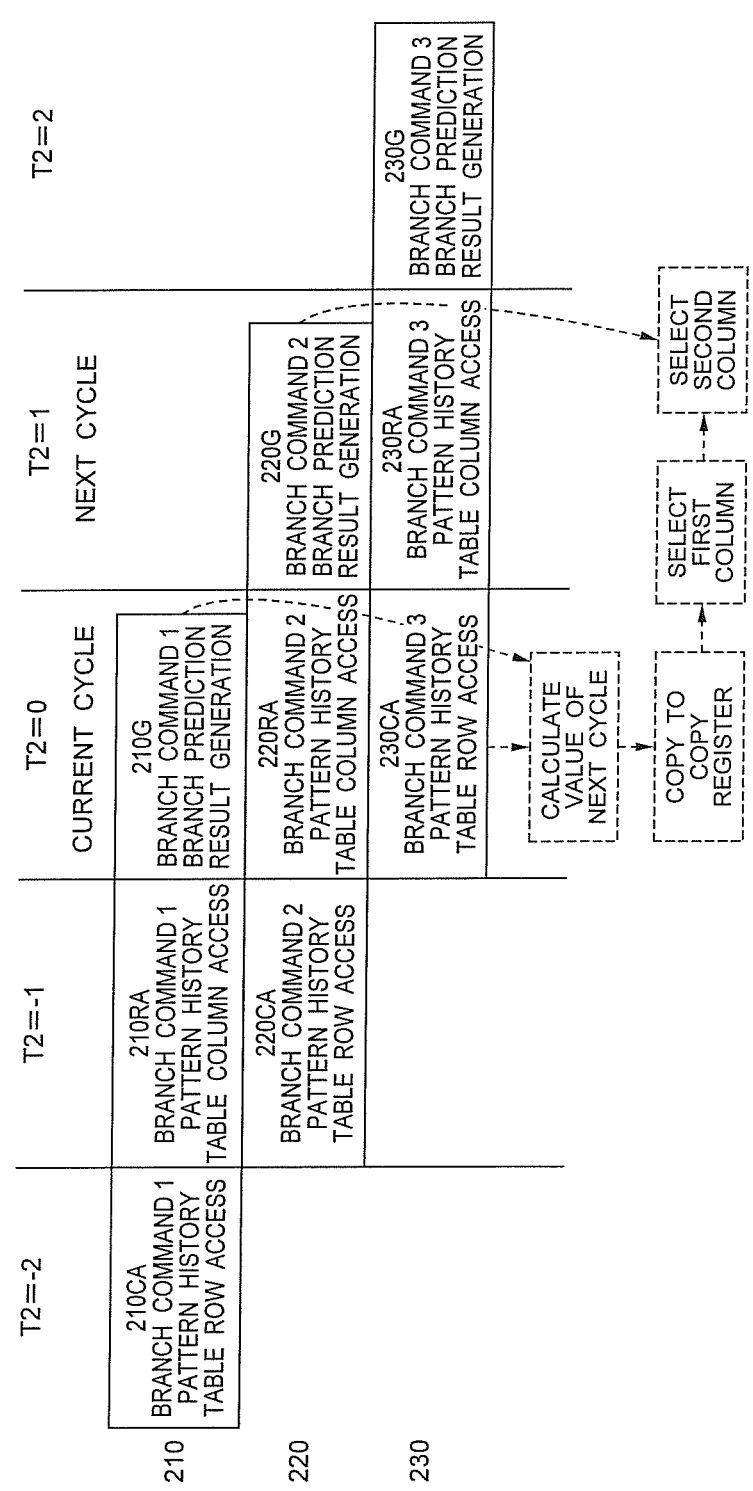
FIG. 6 illustrates a pipeline structure of accessing pattern history tables in the branch prediction device in FIG. 2.
Figure 7:
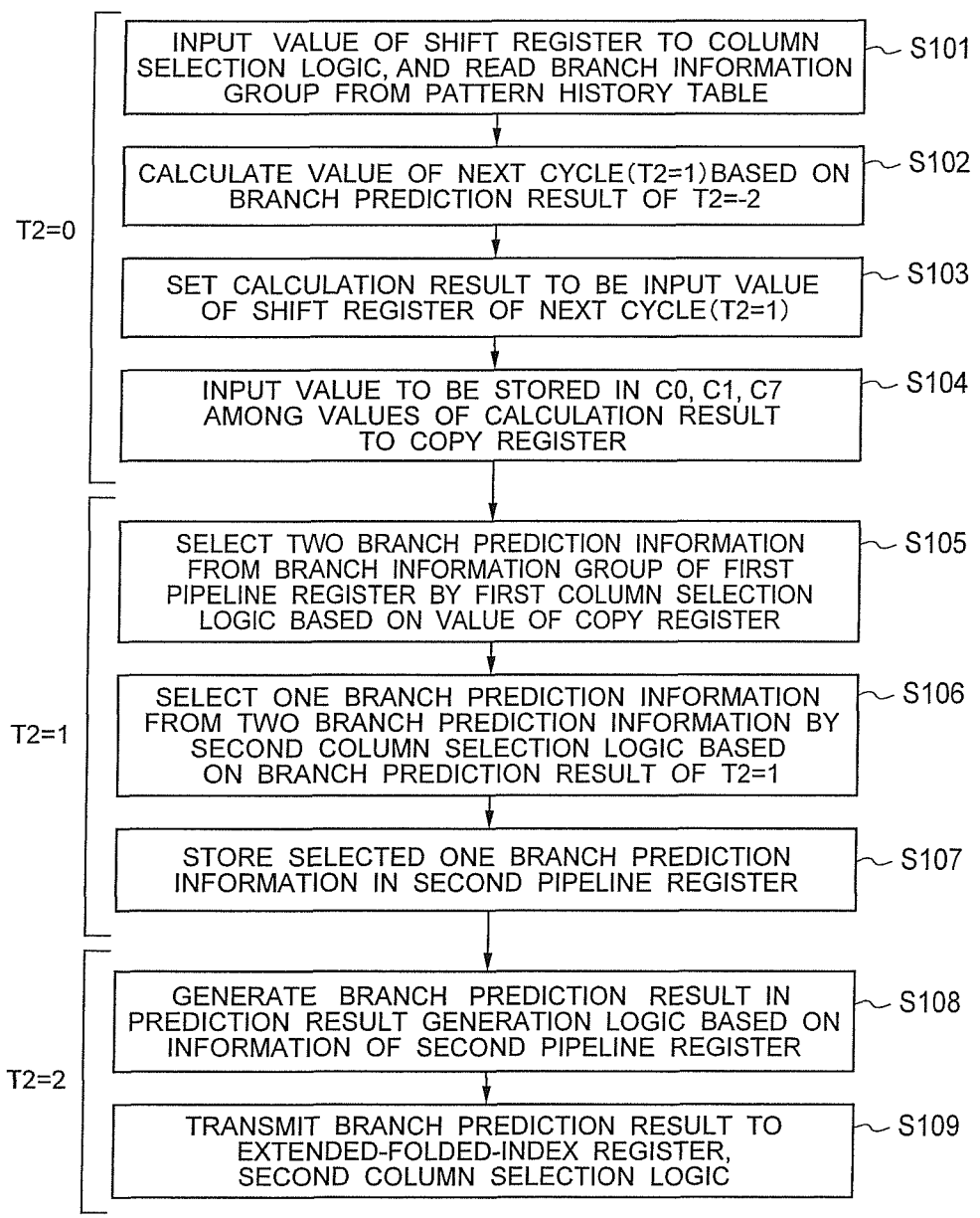
FIG. 7 illustrates an operating process (processing procedure) of pipeline processing for accessing pattern history tables in the branch prediction device according to the first exemplary embodiment of the invention.

The schematic configuration of a branch prediction device according to the exemplary embodiment will be described with reference to FIGS. 1 and 6. FIG. 1 is a block diagram showing an exemplary schematic configuration of a branch prediction device according to the first exemplary embodiment of the invention. FIG. 6 illustrates pipeline processing for accessing a branch prediction information accumulation processing section of the branch prediction device.

As shown in FIG. 1, a branch prediction device 1 includes a branch prediction information accumulation processing section 6 which stores respective branch prediction groups in which pieces of branch prediction information (information indicating estimation of whether branching or not branching) relating to a branch command and pieces of branch establishment availability information indicating availability of establishment of immediately preceding branching (establishing or not establishing) are made into groups, and performs accumulation processing of the respective pieces of branch prediction information. The branch prediction device 1 also includes a pipeline access control section 2 which performs processing including, through pipeline processing, first selection control processing (e.g., processing indicated by 230CA in FIG. 6) for controlling selection of at least one group from the branch prediction groups in response to a request, and second selection control processing (e.g., processing indicated by 230RA in FIG. 6) for controlling selection of one or a plurality of pieces of branch prediction information from the branch prediction group selected in the first selection control processing, and prediction result generation processing (e.g., processing indicated by 230G in FIG. 6) for generation-processing a branch prediction result according to the branch prediction information selected in the second selection control processing, and performs an access to the branch prediction information accumulation processing section 6.

The pipeline access control section 2 includes a first selection control section 4 which accesses the branch prediction information accumulation processing section 6 and controls selection of at least one group from the respective branch prediction groups, a second selection control section 5 which controls selection of one or a plurality of pieces of branch prediction information of the branch prediction group selected by the first selection control section 4, a prediction result generating section 7 which generates a branch prediction result according to the branch prediction information selected by the second selection control section 5, and an index information control section 3 which serves as a branch prediction generation pipeline control section for controlling pipeline processing including the first selection control processing by the first selection control section 4, the second selection control processing by the second selection control section 5, and the prediction result generation processing by the prediction result generating section 7.

Further, the pipeline access control section 2 is capable of controlling processing including the first selection control processing and the second selection control processing in a pipelined manner.

Regarding a value of index information for selecting the branch prediction information or the branch prediction group of the branch prediction information accumulation processing section 6, the index information control section 3 controls, in one period (e.g., a period of T2=0 shown in FIG. 6) of branch prediction generating pipeline for performing the pipeline processing for branch prediction generation, calculation which is performed previously of a value of the index information in another period (e.g., a period of T2=1 shown in FIG. 6) to be performed after the one period, and controls supplement of respective pieces of index information required for respective processing in the respective periods of the branch prediction generation pipeline.

Also, the index information control section 3 calculates the value of the index information in the other period (e.g., a period of T2=1 shown in FIG. 6) based on the branch prediction result which corresponds to another branch prediction command preceding the branch command and is generated in the prediction result generation processing performed in the one period (e.g., a period of T2=0 shown in FIG. 6).

Further, the index information control section 3 calculates a value of the index information corresponding to a branch command which will be a branch prediction target, according to execution path history information (e.g., indicated by D2 in FIG. 3) relating to information of paths of N pieces of branch commands which are executed and passed from the branch command of N pieces before up to the branch command which is to be the branch prediction target.

Furthermore, it is preferable that the index information control section 3 causes an output of a shift register configuring an extended-folded-index-register unit (e.g., indicated by reference numeral 10 in FIG. 2) to be an input of a row selection by the first selection control section 4.

The first selection control section 4 performs the first selection control processing (e.g., processing indicated by 230CA in FIG. 6) by row selection according o the value of the index information corresponding to the one period (e.g., the period of T2=0 in FIG. 6) calculated by the index information control section 3.

The second selection control section 5 performs the second selection control processing by column selection in a period other than the one period during which the first selection control processing is performed with respect to the branch prediction of the same branch command, according to the value of the index information corresponding to the other period calculated by the index information control section 3.

The branch prediction device 1 having the configuration described above will operate schematically as described below. Specifically, the branch prediction device 1 controls, by the index information control section 3, pipeline processing including the first selection control processing by the first selection control section 4, the second selection control processing by the second selection control section 5, and the prediction result generation processing by the prediction result generation section 7.

In this process, regarding the value of the index information for selecting the branch prediction information of the branch prediction group by the branch prediction information accumulation section 6, the index information control section 3 previously calculates, in a period of branch prediction generation pipeline for performed the pipeline processing with respect to branch prediction generation, the value of the index information in another period which is to be performed after the one period, and supplies index information required for processing in each period of the branch prediction generation pipeline. Thereby, calculation processing can be performed by using the index information beforehand.

Further, the index information control section 3 calculates the value of the index information in the other period based on the branch prediction result which corresponds to another branch prediction command preceding the branch command and is generated in the prediction result generation processing performed in the one period.

In this process, the first selection control section 4 performs the first selection control processing by row selection according to the value of the index information corresponding to the one period calculated by the index information control section 3. Further, the second selection control section 5 performs the second selection control processing by column selection during the period other than the one period in which the first selection control processing is performed to the branch prediction of the same branch command, according to the value of the index information corresponding to the other period calculated by the index information control section 3.

Further, the index information control section 3 calculates the value of the index information corresponding to the branch command which is to be the branch prediction target, according to the execution path history information relating to the information of paths of N pieces of branch commands which have been executed and passed from the branch command of N pieces before up to the branch command serving as the branch prediction target. Thereby, by incorporating the execution path history information into the index calculation, the branch prediction accuracy can be improved without introducing a complicated hash logic configuration.

Note that the index information control section 3 includes a configuration to cause an output of a shift register configuring an extended-folded-index-register unit to be an input of a row selection by the first selection control section. Thereby, by causing the value of the register to be an input of a row selection directly, the varying point of the value of the register is fixed, enabling to prevent degradation of the prediction accuracy.

As described above, by performing processing for selecting branch prediction information through pipeline processing, processing for branch prediction can be performed at a high speed. Further, as a delay in the branch prediction processing will never enter into a critical path of the processor, it is possible to provide a branch prediction device capable of contributing to an improvement in the processing speed in the entire processor.

(Detailed Configuration)

Figure 2:
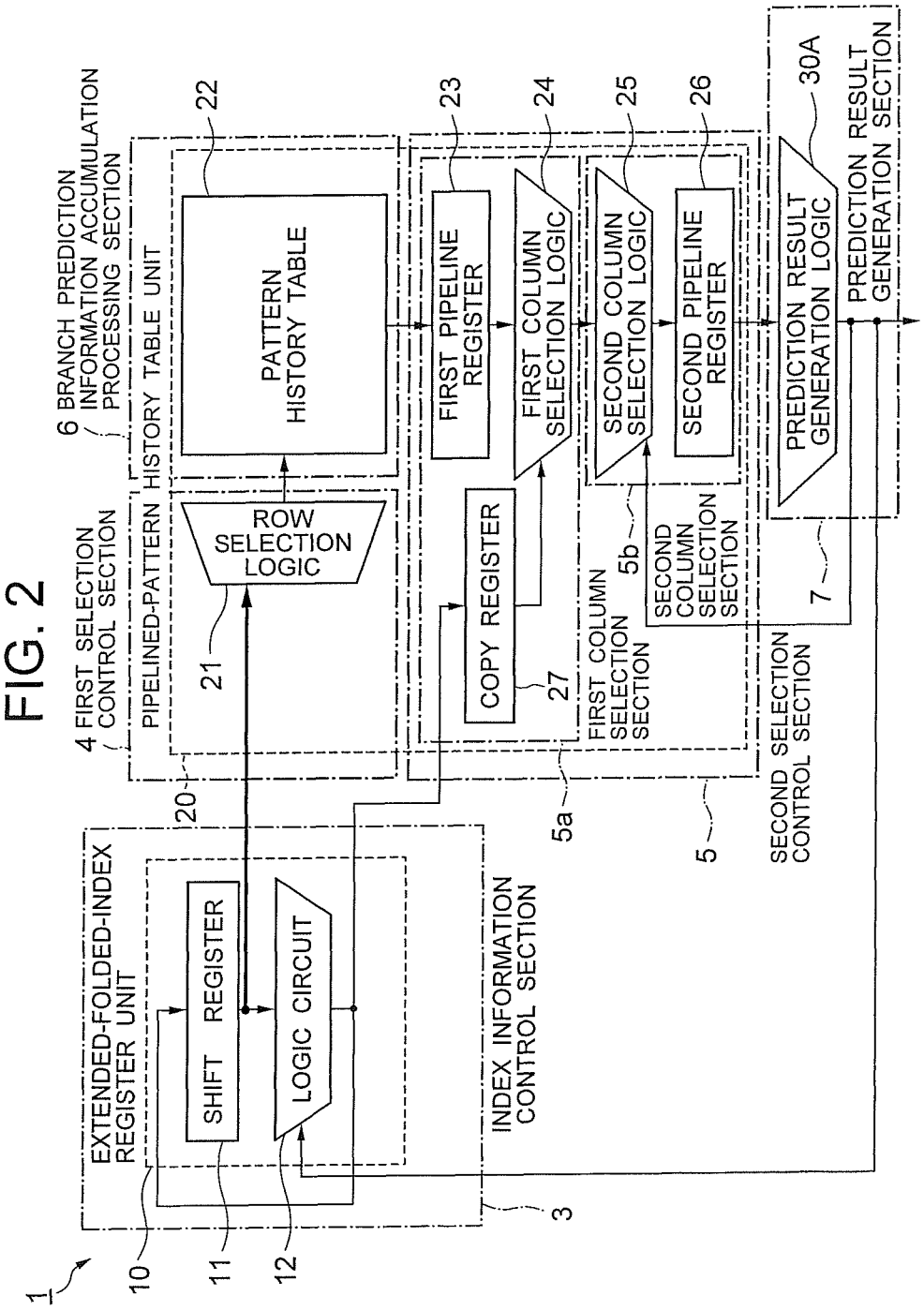
FIG. 2 is a block diagram showing an exemplary configuration of the branch prediction device according to the first exemplary embodiment of the invention.

FIG. 2 discloses exemplary detailed configuration of the respective sections. The detailed configuration of the branch prediction device 1 will be described with reference to FIG. 2.

FIG. 2 is a block diagram showing an example of the detailed configuration of the branch prediction device according to the present invention.

The branch prediction device 1 of the exemplary embodiment is a device using branch history information D1 and execution path history information D2 such as global branch history. As shown in FIG. 2, the branch prediction device 1 includes an extended-folded-index-register unit 10 which is an example of the index information control section 3, a pipelined pattern history table 20 which performs access processing through pipeline processing with respect to the pattern history table 22 which is an example of the branch prediction information accumulation processing section 6, and a prediction result generation logic 30A which is an example of the prediction result generation section 7 for generating a prediction result based on an output from the pipelined pattern history table 20.

The extended-folded-index-register unit 10 includes a shift register 11 and a logic circuit 12, as shown in FIG. 2. The shift register 11 temporarily stores branch history information for past commands and hash values of the branch command addresses.

The logic circuit 12 includes a function (information update function) of updating information temporarily stored in the shift register 11. As an input of the logic circuit 12, a hash value of a rewinding destination, a command address of an object branch command (e.g., from BTB not shown <storing branch destination addresses corresponding to respective branch commands>), an output of a branch prediction logic immediately before the prediction result generation logic 30A, and an output of the shift register 11, are used. Therefore, the logic circuit 12 includes a function of inputting a hash value of a rewound destination, a function of inputting an object branch command address, a function of inputting an output of a branch prediction logic immediately before, and a function of inputting an output of the shift register.

A hash value of a rewinding destination is selected when the branch prediction result is found to be wrong.

Regarding the branch command address, an output of the prediction result generation logic 30A, and an output of the shift register 11, a part of them is used for recalculating a hash value.

The pipelined pattern history table 20 includes: a pattern history table 22 which is an example of a branch prediction information accumulation processing section for accumulate-processing branch prediction information; a row selection logic 21 which selects by row selection a specific group from groups of the branch prediction information stored in the pattern history table 22 based on the output from the shift register 11 of the extended-folded-index-register unit 10; a first pipeline register 23 which is an example of a branch prediction group information temporary storing block for temporarily storing the specific group of the branch prediction information selected by the row selection logic 21 and output from the pattern history table 22, a copy register 27 which is an example of a column selection information temporary storing block for temporarily storing by reproducing an output (column selection information in the index information) from the logic circuit 12 of the extended-folded-index-register 10; a first column selection logic 24 working as a first column selection logic circuit which selects by column selection some specific pieces of branch prediction information from a plurality of pieces of branch prediction information of the specific group storing in the first pipeline register 23, according to the information from the copy register 27; a second column selection logic 25 working as a second column selection logic circuit which selects, by column selection, specific branch prediction information from a plurality of pieces of branch prediction information selected by the first column selection logic 24, according to an output from the prediction result generation logic 30A; and a pipeline register 26 which is an example of a branch prediction information temporary storing block for temporarily storing an output of the second column selection logic 25.

Here, the copy register 27 (column selection information temporary storing block) and the first pipeline register 23 (branch prediction group information temporary storing block) and the first column selection logic 24 (first column selection logic circuit) may configure a first column selection section 5a. The first column selection section 5a is capable of selecting at least two pieces of branch prediction information from one branch prediction group, according to the value of the index information.

Further, the second column selection logic 25 and the second pipeline register 26 may configure a second column selection section 5b. The second column selection section 5b is capable of selecting one piece of branch prediction information of the pieces of branch prediction information selected by the first column selection section, according to the branch prediction result information generated through the branch result generation processing.

The pattern history table 22 stores 1-bit branch prediction information (information indicating prediction of whether to be branched or not branched), and a-bit information (branch establishment availability information) indicating availability of establishment (established/not established) of branch immediately before, that is, 2 bits in total. As this information realizes reading process of two stages, this information is configured of some groups (branch prediction groups).

An appropriate branch prediction group is selected by row selection processing, and appropriate branch prediction information is selected from the branch prediction group by column selection processing.

The copy register 27 temporarily stores information in which a hash value of the logic circuit 12 is copied in order to input the information into the first column selection logic 24. That is, the copy register 27 which is an example of a row selection information temporary storing block is capable of storing column selection information of the index information by a partial value of the shift register 11 configuring the expanded-folded-index-register unit 10 being reproduced.

The row selection logic 21 directly decodes an output from the shift register 11 and reads out an appropriate branch prediction group of the pattern history table 22. The entry of the read-out pattern history table 22 is stored in the first pipeline register 23.

The value of the first pipeline register 23 is selected by the first column selection logic 24 according to the value of the copy register 27. That is, the first pipeline register 23 which is an example of a branch prediction group information temporary storing block is capable of storing information relating to the one branch prediction group selected by the first selection control section.

The first column selection logic 24 selects a value appropriate for a value of the next branch command. That is, the first column selection logic 24 working as a first column selection logic circuit is capable of selecting at least two pieces of branch prediction information from the one branch prediction group, according to the value of the column selection information of the column selection information temporary storing block and information relating to the one branch prediction group of the branch prediction group information temporary storing section.

An output of the second column selection logic 25 is selected by an output of the prediction result generation logic 30A, and is stored in the second pipeline register 26.

Now, the corresponding relationship between the constituent features of the exemplary embodiment and the constituent features of the present invention will be described. The row selection logic 21 is an example of the first selection control section 4. Further, as an example of the second selection control section 5, there is a configuration formed of the first pipeline register 23, the first column selection logic 24, the second column selection logic 25, the second pipeline register 26, and the copy register 27. The prediction result generation logic 30A is an example of the prediction result generation section 7, and the pattern history table 22 is an example of the branch prediction information accumulation processing section.

In the branch prediction device 1 shown in FIG. 2 having the above-described configuration, the extended-folded-index-register unit 10 efficiently hashes information of a long branch history (e.g., global branch history information D1) and execution path history information D2. With the execution path history information D2 being input, the branch prediction accuracy can be improved.

Further, an output of the shift register 11 of the extended-folded-index-register unit 10 becomes an input of the row selection logic 21 of the pattern history table 22. Thereby, as the row selection logic 21 reads out a collection of branch prediction information relating to the object branch command, delays in branch prediction are reduced.

In addition, as an output from the pipeline register is directly applied to information of column selection, delays are reduced.

Further, as read-out processing of the pattern history table 22 is processed in a pipelined manner in two steps of row selection and column selection, the processing speed can be improved without impairing the branch prediction accuracy.

In this way, in the exemplary embodiment, an index using the execution path history information D2 is produced by utilizing the extended-folded-index-register unit, to thereby make an access to the pattern history table to be pipelined. As such, it is possible to realize branch prediction with high accuracy and low delay.

(Detailed Configuration of Extended-Folded-Index-Register Unit)

Figure 3:
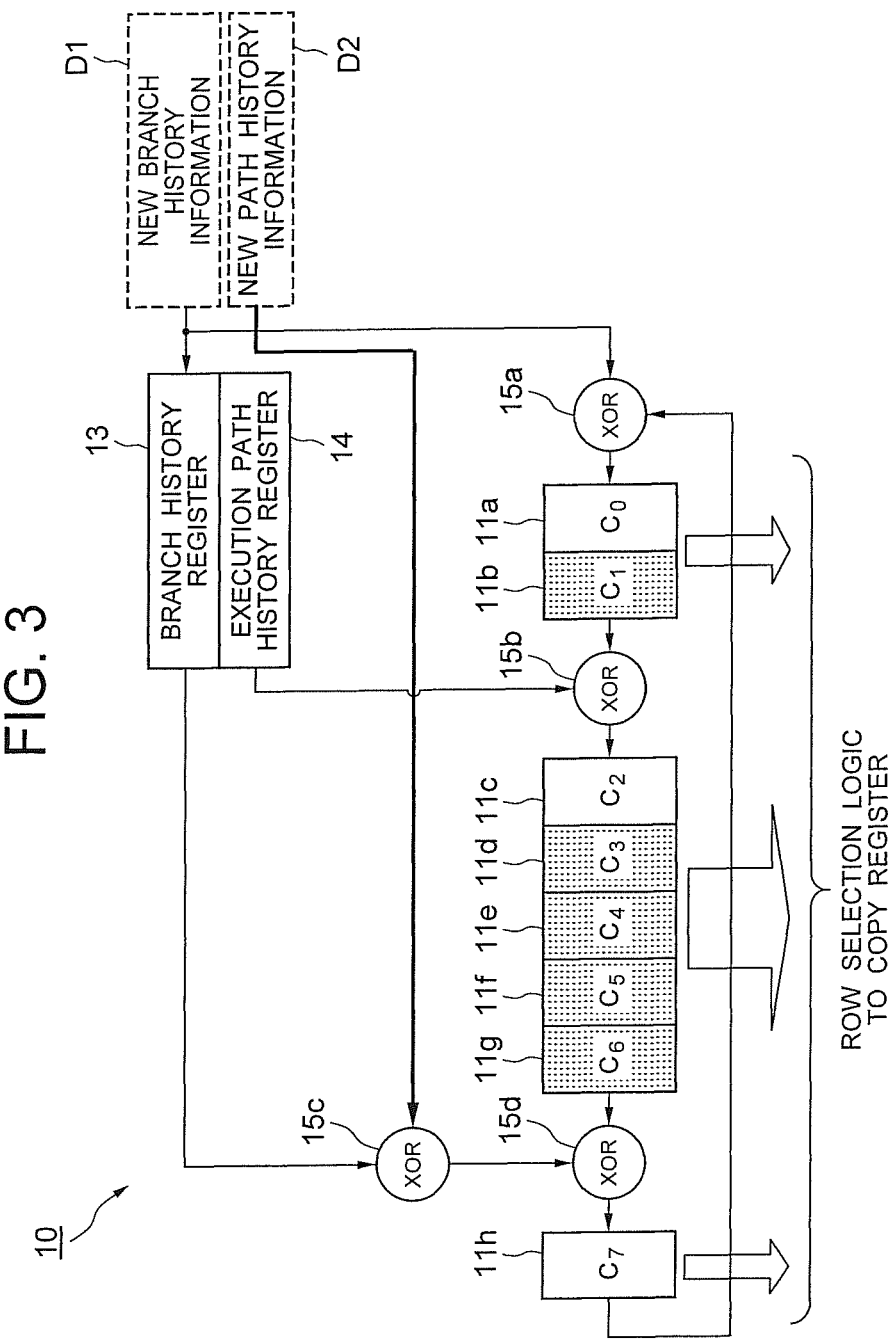
FIG. 3 is a block diagram showing an exemplary internal configuration of an extended-folded-index-register of the branch prediction device in FIG. 2.

Next, the detailed configuration of the extended-folded-index-register unit 10 will be described with reference to FIG. 3. FIG. 3 is a block diagram showing an exemplary internal configuration of the extended-folded-index-register unit of the branch prediction device shown in FIG. 1.

Referring to FIG. 3, the detailed exemplary configuration of the extended-folded-index-register unit in FIG. 2 is shown.

As shown in FIG. 3, the extended-folded-index-register unit 10 includes: the branch history register 13 as a branch history information temporary storing section which temporarily stores branch history information such as new branch history information D1; an execution path history register 14 as an execution path history information temporary storing section which temporarily stores execution path history information, a first XOR (exclusive-OR) arithmetic circuit 15a which performs XOR operation ("1" is output when two input values are different, and "0" is output when two input values are the same) based on the two input values of the logic value of the new branch history information D1 and the logic value of an output of a seventh register (C7) 11h, a first register (C0) 11a which temporarily stores an output of the first XOR arithmetic circuit 15a; a second register (C1) 11b in which when new data is input to the first register (C0) 11a, old data having been stored in the first register (C0) 11a is shifted and input thereto; a second XOR arithmetic circuit 15b which performs XOR operation based on the two input values of the logic value of an output of the second register (C1) 11b and the logic value of an output of the execution path history register 14; a third register (C2) 11c which temporarily stores an output of the second XOR arithmetic circuit 15b; a fourth register (C3) 11d in which when new data is input into the third register (C2) 11c, old data stored in the third register (C2) 11c is shifted and input thereto; a fifth register (C4) 11c in which when new data is input into the fourth register (C3) 11d, old data stored in the fourth register (C3) 11d is shifted and input thereto; a sixth register (C5) 11f in which when new data is input into the fifth register (C4) 11e, old data stored in the fifth register (C4) 11e is shifted and input thereto; a seventh register (C6) 11g in which when new data is input into the sixth register (C5) 11f, old data stored in the sixth register (C5) 11f is shifted and input thereto; a third XOR arithmetic circuit 15c which performs XOR operation according to the two input values of the logic value of an output of the branch history register 13 and the logic value of the new path history information D2; a fourth XOR arithmetic circuit 15d which performs XOR operation based on two input values including a logic value of an output of the third XOR arithmetic circuit 15c and a logic value of an output of the seventh register (C6) 11g; and an eighth register (C7) 11h which temporarily stores an output of the fourth XOR arithmetic circuit 15d.

The first register (C0) 11a, the second register (C1) 11b, the third register (C2) 11c, the fourth register (C3) 11d, the fifth register (C4) 11e, the sixth register (C5) 11f, the seventh register (C6) 11g, and the eighth register (G7) 11h configure the shift register 11 of the extended-folded-index-register unit 10 shown in FIG. 1.

Further, the branch history register 13, the execution path history register 14, the first XOR arithmetic circuit 15a, the second XOR arithmetic circuit 15b, the third XOR arithmetic circuit 15c, and the fourth XOR arithmetic circuit 15d configure the logic circuit 12 of the extended-folded-index-register unit 10.

The first register (C0) 11a to which an output of the XOR arithmetic circuit, the third register (C2) 11c, and the eighth register (C7) 11h become variable according to the branch history information D1 and the execution path history information D2.

Further, in the second register (C1) 11b, the fourth register (C3) 11d, the fifth register (C4) 11e, the sixth register (C5) 11f, and the seventh register (C6) 11g, values are variable according to respective bit shift.

Furthermore, values of the first register (C0) 11a, the second register (C1) 11b, and the eighth register (C7) 11h are copied to the copy register 27. As such, the shift register 11 includes the first register which is input to the row selection logic 21 and the second register which is copied to the copy register 27.

The execution path history register 14 stores a history regarding information of path of N branch commands passed from the branch command of N pieces before up to the target branch command. By the execution path history information, high branch prediction accuracy is realized.

In the exemplary configuration of the logic circuit 12 shown in FIG. 3, 15-bit branch history information D1 and 10-bit execution path history information D2, that is, total 25 bits, are compressed using a hash logic to thereby produce 8-bit index information. This bit length is variable, and the bits can be hashed.

The one-cycle ahead status of information stored in the first register (C0) 11a to the eighth register (C7) 11h, other than that in registers receiving an input of XOR, is simple bit shift.

For example, C0, C2, C3, C4 and C5 among the respective registers 11a to 11h shown in FIG. 3 become the contents of C1, C3, C4, C5 and C6 in the next cycle. In other words, C0, C2, C3, C4 and C5 become C1, C3, C4, C5 and C6, being shifted, in the next cycle.

Therefore, by using the register values of C0, C2, C3, C4 and C5 as index information of row access, it is possible to start the time of the pattern history table at one cycle before without lowering the branch prediction accuracy.

As such, in the extended-folded-index-register 10, by utilizing the fact that the almost all of the register values after one cycle are available, an access to the pattern history table is started ahead by one cycle in a manner that index information including the index information of the previous cycle and the index information of the later cycle will not be impaired. Thereby, it is possible to pipeline an access to the pattern history table for 2 stages (or 3 stages if prediction result generation processing is included) in the branch prediction result generating process.

Further, branch prediction accuracy of the same level as that in the case of introducing a complicated hash logic by introducing the execution path history information D2 into the index calculated on the pattern history table in a manner of not increasing delays using the extended-folded-index-register 10. Thereby, the hash logic can be removed without deteriorating the branch prediction accuracy. Accordingly, delays in the branch prediction processing can be reduced while maintaining the branch prediction accuracy and not allowing delays of the branch prediction to come into the critical path of the processor.

(Pipeline Structure of the Processor)

Now, before describing a pipeline structure relating to an access to a pattern history table which is a feature of the exemplary embodiment, each stage of the pipeline structure of the processor will be described with reference to FIG. 4. FIG. 4 illustrates the pipeline structure of a processor including a branch prediction device.

It is assumed that the branch prediction device 1 is used on the processor having the pipeline structure shown in FIG. 4. Although FIG. 4 shows the pipeline structure configured of eight configurations of T=0 to T=9, the branch prediction device 1 is applicable to a processor other than that configured of eight configurations.

As shown in FIG. 4, in the pipeline processing of the processor, each of four commands, that is, a first command 110, a second command 120, a third command 130, and a fourth command 140, has eight stages including a fetch stage (fetch processing), a decode stage (decode processing), an operand read state (operand read processing), an execution state (execution processing), a memory access stage (memory access processing), a write-back stage (write-back processing), a commit stage (commit processing), and a retire stage (retire processing).

More specifically, regarding the first command 110, it is configured to process the fetch stage 110F (first fetch processing) in T1=0, the decode stage 110D (first decode processing) in T1=1, the operand read stage 110OP (first operand read processing) in T1=2, the execution stage 110EX (first execution processing) in T1=3, the memory access stage 110MA (first memory access processing) in T1=4, the write-back stage 110WR (first write-back processing) in T1=5, the commit stage 110CO (first commit processing) in T1=6, and the retire stage 110RE (first retire processing) in T1=7.

Regarding the second command 120, it is configured to process it is configured to process the fetch stage 120F (second fetch processing) in T1=1, the decode stage 120D (second decode processing) in T1=2, the operand read stage 120OP (second operand read processing) in T1=3, the execution stage 120EX (second execution processing) in T1=4, the memory access stage 120MA (second memory access processing) in T1=5, the write-back stage 120WR (second write-back processing) in T1=6, the commit stage 120CO (second commit processing) in T1=7, and the retire stage 120RE (second retire processing) in T1=8.

Regarding the third command 130, it is configured to process the fetch stage 130F (third fetch processing) in T1=2, the decode stage 130D (third decode processing) in T1=3, the operand read stage 130OP (third operand read processing) in T1=4, the execution stage 130EX (third execution processing) in T1=5, the memory access stage 130MA (memory access processing) in T1=6, the write-back stage 130WR (third write-back processing) in T1=7, the commit stage 130CO (third commit processing) in T1=8, and the retire stage 130RE (third retire processing) in T1=9.

Regarding the fourth command 140, it is configured to process the fetch stage 140F (fourth fetch processing) in T1=3, the decode stage 140D (fourth decode processing) in T1=4, the operand read stage 140OP (fourth operand read processing) in T1=5, the execution stage 140EX (fourth execution processing) in T1=6, the memory access stage 140MA (fourth memory access processing) in T1=7, the write-back stage 140WR (fourth write-back processing) in T1=8, the commit stage 140CO (fourth commit processing) in T1=9, and the retire stage 140RE (fourth retire processing) in T1=10.

As such, in T1=0 (first processor period), the processor executes only processing of the fetch stage 110F regarding the first command 110.

In T1=1, the processor executes processing of the decode stage 110D regarding the first command 110, and processing the fetch stage 120F regarding the second command 120, simultaneously.

In T1=2, the processor executes processing of the operand read stage 110OP regarding the first command 110, processing of the decode stage 120D regarding the second command 120, and processing of the fetch stage 130F regarding the third command 130, simultaneously.

In T1=3, the processor executes processing of the execution stage 110EX regarding the first command 110, processing of the operand read stage 120OP regarding the second command 120, processing of the decode stage 130D regarding the third command 130, and processing of the fetch stage 140F regarding the fourth command 140, simultaneously.

In T1=4, the processor executes processing of the memory access stage 110MA regarding the first command 110, processing of the execution stage 120EX regarding the second command 120, processing of the operand read stage 130OP regarding the third command 130, and processing of the decode stage 140D regarding the fourth command, simultaneously.

In T1=5, the processor executes processing of the write-back stage 110WR regarding the first command 110, processing of the memory access stage 120MA regarding the second command 120, processing of the execution stage 130MA regarding the third command 130, and processing of the operand read stage 140OP regarding the fourth command, simultaneously.

In T1=6, the processor executes processing of the commit stage 110CO regarding the first command 110, processing of the write-back stage 120WR regarding the second command 120, processing of the memory access stage 130MA regarding the third command 130, and processing of the execution stage 140EX regarding the fourth command, simultaneously.

In T1=7, the processor executes processing of the retire stage 110RE regarding the first command 110, processing of the commit stage 120CO regarding the second command 120, processing of the write-back stage 130WR regarding the third command 130, and processing of the memory access stage 140MA regarding the fourth command, simultaneously.

In T1=8, the processor executes processing of the retire stage 120RE regarding the second command 120, processing of the commit stage 130CO regarding the third command 130, and the write-back stage 140WR regarding the fourth command 140, simultaneously.

In T1=9, the processor executes processing of the retire stage 130RE regarding the third command 130, and processing of the commit stage 140CO regarding the fourth command 140, simultaneously.

In T1=10, the processor executes only processing of the retire stage 140RE regarding the fourth command 140.

In the processor performing the pipeline processing as described above, the branch prediction device generates branch prediction results in the fetch stages 110F, 210F, 310F and 410F.

(Pipeline Structure Regarding Access to Patten History Table)

Next, schematic stages of the pipeline structure regarding an access to a pattern history table will be described with reference to FIG. 5. FIG. 5 illustrates a pipeline structure regarding accessing to a pattern history table in the branch prediction device of FIG. 1. Although FIG. 5 describes only three commands including a first branch command 210, a second branch command 220, and a third branch command 230 in the convenience of description, branch prediction processing corresponding to further branch commands will be pipeline-processed sequentially.

As shown in FIG. 5, in the pipeline structure regarding accessing to the pattern history table, each of the first branch command 210, the second branch command 220, and the third branch command 230 has three stages, including, processing (first selection control processing) of a stage of a pattern history table row access for performing access processing to select a branch prediction group of the pattern history table by a row selection logic, processing (second selection control processing) of a stage of a pattern history table column access for performing access processing to select, by the first and second column selection logics 24 and 25, branch prediction information from the branch prediction group selected by the row selection logic, and processing (prediction result generation processing) of a stage of branch prediction result generation for performing processing to generate a branch prediction result based on the selected branch prediction information. Here, the stage of branch prediction result generation is set to be performed in a shorter period than the periods of other stages.

In detail, regarding the first branch command 210, it is configured to process processing (first row selection processing) of the stage of the pattern history table row access 210CA in T2=−2, processing (first row selection processing) of the stage of the pattern history table column access 210RA in T2=−1, and processing (first branch prediction result generation processing) of the stage of the branch prediction result generation 210G in T2=0.

Here, the value of T2 is set to correlate with the value of T1 of the pipeline processing of the processor. That is, preprocessing for branch prediction is performed at the time of T2=−2 prior to T1=0 of the pipeline processing of the processor.

Regarding the second branch command 220, it is configured to process processing (second row selection processing) of the stage of pattern history table row access 220CA in T2=−1, processing (second column selection processing) of the stage of pattern history table column access 220RA in T2=0, and processing (second branch prediction result generation processing) of the stage of the branch prediction result generation 220G in T2=1.

Regarding the third branch command 230, it is configured to process processing (third row selection processing) of the stage of pattern history table row access 230CA in T2=0, processing (third column selection processing) of the stage of pattern history table column access 230RA in T2=1, and processing (third branch prediction result generation processing) of the stage of branch prediction result generation 230G in T2=2.

Therefore, in T2=−2 (first period/first step), the branch prediction device executes only processing (first row selection processing) of the stage of pattern history table row access 210CA regarding the first branch command 210 (first step).

In T2=−1 (second period/second step), the branch prediction device executes processing (first column selection processing) of the stage of pattern history table column access 210RA regarding the first branch command 210, and processing (second row selection processing) of the stage of pattern history table regarding the second branch command 220, simultaneously (second step).

In T2=0 (third period/third step), the branch prediction device executes processing (first branch prediction result generation processing) of the stage of branch prediction result generation 210G regarding the first branch command 210, processing (second column selection processing) of the stage of pattern history table column access 220RA regarding the second branch command 220, and processing (third row selection processing) of the stage of pattern history table row access 230CA regarding the third branch command 230, simultaneously (third step).

In T2=1 (fourth period/fourth step), the branch prediction device executes processing (second branch prediction result generation processing) of the stage of branch prediction result generation 220G regarding the second branch command 220, and processing (third column selection processing) of the stage of pattern history table column access 230 regarding the third branch command 220, simultaneously (fourth step).

In T2=2 (fifth period/fifth step), the branch prediction device executes only processing (second branch prediction result generation processing) of the stage of branch prediction result generation 230G regarding the third branch command 230 (fifth step).

Although the contents of the stages of pipeline processing have been described above, more detailed processing procedures will be described below together with operation of the branch prediction device for realizing the above-described pipeline processing.

(Description of Operation (Processing Procedures) of Branch Prediction Device)

Various processing procedures in the branch prediction device will be described with reference to FIGS. 2, 3, 6 and 7. First, the basic configuration of a branch prediction method will be described, followed by branch prediction procedures, and update procedures after the branch prediction procedures.

Here, the basic configuration of a branch prediction method according to the exemplary embodiment will be described. In the branch prediction method according to the exemplary embodiment, the branch prediction device which performs branch prediction regarding a branch command refers to the branch prediction information accumulation processing section which stores branch prediction groups in which branch prediction information (predict whether to branch or not) regarding the branch command and branch establishment availability information indicating availability of establishment (established/not established) of immediately preceding branch are grouped, and accumulation-processes the branch prediction information, and generates branch prediction result regarding the branch commands to thereby perform branch prediction.

if it is described using the stages of the pipeline processing described above, the basic configuration of the branch prediction method according to the exemplary embodiment includes: first selection control processing (e.g., 230CA shown in FIG. 5) for selection-controlling one of the various branch prediction groups of the branch prediction information accumulation processing section regarding at least one of the branch commands; second selection control processing (e.g., 230RA in FIG. 5) for selection-controlling one or plurality of pieces of branch prediction information from the branch prediction group selected in the first selection control processing; and branch prediction result generation processing (e.g., 230G shown in FIG. 5) for generating a branch prediction result regarding the branch command according to the branch prediction information selected in the second selection control processing. In the branch prediction method, pipeline processing for the first selection control processing, the second control processing, and the branch prediction result generation processing can be performed regarding the branch command.

In this process, the first selection control processing includes row selection processing for selection-controlling the branch prediction group by a row selection. The first selection control processing includes column selection processing for selection-controlling one or a plurality of pieces of branch prediction information by a column selection.

In addition, the specific configurations of the branch prediction method according to the exemplary embodiment include: a first step (e.g., a step performed in T2=−2 shown in FIGS. 5 and 6) of performing first row selection processing for selecting the branch prediction group regarding a first branch command in the first period; a second step (e.g., steps performed in T2=−1 shown in FIGS. 5 and 6) of performing first column selection processing for selecting one or a plurality of pieces of branch prediction information regarding the first branch command in the second period following the first period; a third step (e.g., steps performed in T2=−1 shown in FIGS. 5 and 6) for performing first branch prediction result generation processing for generating a branch prediction result regarding the first branch command, according to the branch prediction information selected by the first column selection processing regarding the first branch command, in the third period following the second period.

In this process, in the second step (T2=−1), the first column selection processing (e.g., 210RA shown in FIGS. 5 and 6), the second row selection processing (e.g., 220CA shown in FIGS. 5 and 6) for selecting the branch prediction group regarding the second branch command to be processed following the first branch command can be performed in parallel.

Further, in the third step (T2=−2), the first branch prediction result generation processing (e.g., 210G shown in FIGS.

5 and 6), the second column selection processing (e.g., 220RA shown in FIGS. 5 and 6) for selecting one or a plurality of pieces of branch prediction information regarding the second branch command, and the third row selection processing (e.g., 230CA shown in FIGS. 5 and 6) for selecting the branch prediction group regarding the third branch command to be processed following the second branch command can be performed in parallel.

In the pipeline processing shown in FIGS. 5 and 6, the processing performed in the first period of T2=−2 may be called as a first step, the processing performed in the second period of T2=−1 may be called as a second step, the processing performed in the third period of T2=0 may be called as a third step, the processing performed in the fourth period of T2=1 may be called as a fourth step, and the processing performed in the fifth period of T2=2 may be called as a fifth step. Further, each processing performed in each step (e.g., pattern history table row access) may be called as a stage.

(Branch Prediction Procedure)

First, the branch prediction procedure will be described with reference to FIGS. 2, 3, 6, and 7. In the processor having the branch prediction device of the exemplary embodiment, procedures to generate a branch prediction result in the processing ("T2=2", processing within the fifth step) of the stage of branch prediction result generation 230G in the processing relating to branch prediction of the third branch command shown in FIGS. 5 and 6 will be described in the order of "T2=0" (third step), "T2=1" (fourth step), and "T2=2" (fifth step) in this example.

First, as shown in FIG. 6, as a step of fetching a branch command according to the branch prediction result generated in the branch prediction result generation processing 230G in T2=2 stage is "T2=2" (fifth step), processing relating to branch prediction is started two cycles before fetching the branch prediction ("T2=0", third step). At the point of starting "T2=0" (third step), the first branch prediction result generation processing in the processing relating to branch prediction of the first branch command started in T2=−2 and the second branch prediction result generation processing in the processing relating to branch prediction of the second branch command started in T2=−1 have not been finished.

<T2=0 (Third Step)>

In the third period of T2=0 shown in FIG. 6, the branch prediction device inputs into the row selection logic 21 a value which will not be changed in the next cycle (T2=1) of the first register (C0) 11a, the third register (C2) 11c, the fourth register (C3) 11d, the fifth register (C4) 11e, and the sixth register (C5) 11f, configuring the shift register 11 shown in FIG. 3, and reads out a branch information group from the pattern history table (step S101 in FIG. 7) <row selection processing>.

Next, in the third period of T2=0 shown in FIG. 6, the branch prediction device calculates a value of the next cycle (T2=1) in the shift register 11 (11a-11h) of the extended-folded-index-register unit 10 shown in FIG. 3 (step S102 in FIG. 7) <next cycle value calculation processing>. Calculating of this value is performed using the branch prediction result generated in the branch prediction result generation processing 210G of T2=−2 which is processing relating to the first branch command shown in FIG. 6 (procedure 1).

Further, this branch prediction result corresponds to an output of the prediction result generation logic 30A shown in FIG. 1.

Further, in the third period of T2=0 shown in FIG. 6, the branch prediction device performs processing to cause the calculated value (calculation result) to be an input value of the shift register 11 in the next cycle (T2=1) (step S103 in FIG. 7) <next cycle value input processing>.

Additionally, in the third period of T2=0 shown in FIG. 6, the branch prediction device performs processing to input to the copy register 27 a value to be stored in each of the first register (C0) 11a, the second register (C1) 11b, the eighth register (C7) 11h configuring the shift register 11, of the value input the calculated value (calculation result) as an input value of the shift register 11 in the next cycle (T2=1) (step S104 shown in FIG. 7) <copy register value input processing>.

In this way, in the third period of T2=0 shown in FIG. 6, the branch prediction device performs processing of the stage of row access 230CA of the pattern history table relating to the third branch command (third row selection processing).

<T2=1 (Fourth Step)>

In the fourth period of T2=1 shown in FIG. 6, the branch prediction device performs processing to select, in the first column selection logic 24, two pieces of branch prediction information from the branch information group which is the output of the first pipeline register 23 based on the value of the copy register 27 (step S105 in FIG. 7) <column selection first processing (if limited to the third branch order, third column selection first processing)>.

Further, in the fourth period of T2=1 shown in FIG. 6, the branch prediction device selects, based on the branch prediction result (corresponding to the output of the prediction result generation logic 30A in FIG. 1) of the branch prediction result generation processing 220G relating to the second branch command, one value of branch prediction information from the two values of branch prediction information selected in the first column selection logic 24, in the second column selection logic 25 (step S106 in FIG. 7) <column selection second processing (if limited to the third branch order, third column selection second processing)> (procedure 2).

Here, since a delay in this part is not large, it is possible to operate the next step here.

The result obtained in this procedure is stored in the second pipeline register 26.

In this way, through the column selection first processing and the column selection second processing, in the fourth period of T2=1 shown in FIG. 6, the branch prediction device performs processing of the stage of column access 230RA of the pattern history table regarding the third branch command (third column selection processing).

<T2=2 (Fifth Step)>

Next, in the fifth period of T2=2 shown in FIG. 6, the branch prediction device generates a branch prediction result of processing of the stage of branch prediction result generation 230G regarding the third branch command (if limited to the third branch command, third prediction result generation processing) according to the branch prediction result information stored in the second pipeline register 26 (step S108 in FIG. 7) <branch prediction result generation processing>.

Next, in the fifth period of T2=2 shown in FIG. 6, as the branch prediction result information generated in the prediction result generation logic 30A is required for the subsequent processing (procedure 1, procedure 2, the same processing in the next cycle <processing such as calculation of a value in the next cycle and second column selection in the cycle>), the branch prediction device performs processing to transmit the branch prediction result information to the extended-folded-index-register unit 10 and the second column selection logic 25 (step S109 in FIG. 7) <branch prediction result information transmission processing>.

As the above-described paths (row selection processing, column selection processing, branch prediction result generation processing) are configured such that each stage is made into a sufficiently simple work, they will never be in the critical path of the processor.

As such, in the third step, after the third row selection processing, processing for calculation the value of the index information of the branch prediction information accumulation processing section, which is to be processed in the fourth step in the fourth period after the third period, can be performed in advance according to the first branch prediction result information generated in the first branch prediction result generation processing.

Further, in the third step, it is possible to extract the value of the index information for the third column selection processing, to be processed in the fourth period, and stores in a specific column selection information temporal storing section, based on the calculated value of the index information.

Furthermore, in the third step, it is possible to store the calculated value of the index information as a value of index information for the fourth row selection processing to be processed in the fourth period.

On the other hand, the fourth step may include the second generation prediction result generation processing for generating the second branch prediction result information generated regarding the second branch command, the third column selection first processing for selection at least two pieces of branch prediction information based on any one of the branch prediction group selected from the branch prediction groups in the third row selection processing and the value of the column selection information temporal storing section, and the third column selection second processing for selecting one branch from the branch prediction information selected in the third column selection first processing according to the second branch prediction result information generated in the second branch prediction result generation processing.

(Update Procedure)

Figure 8:
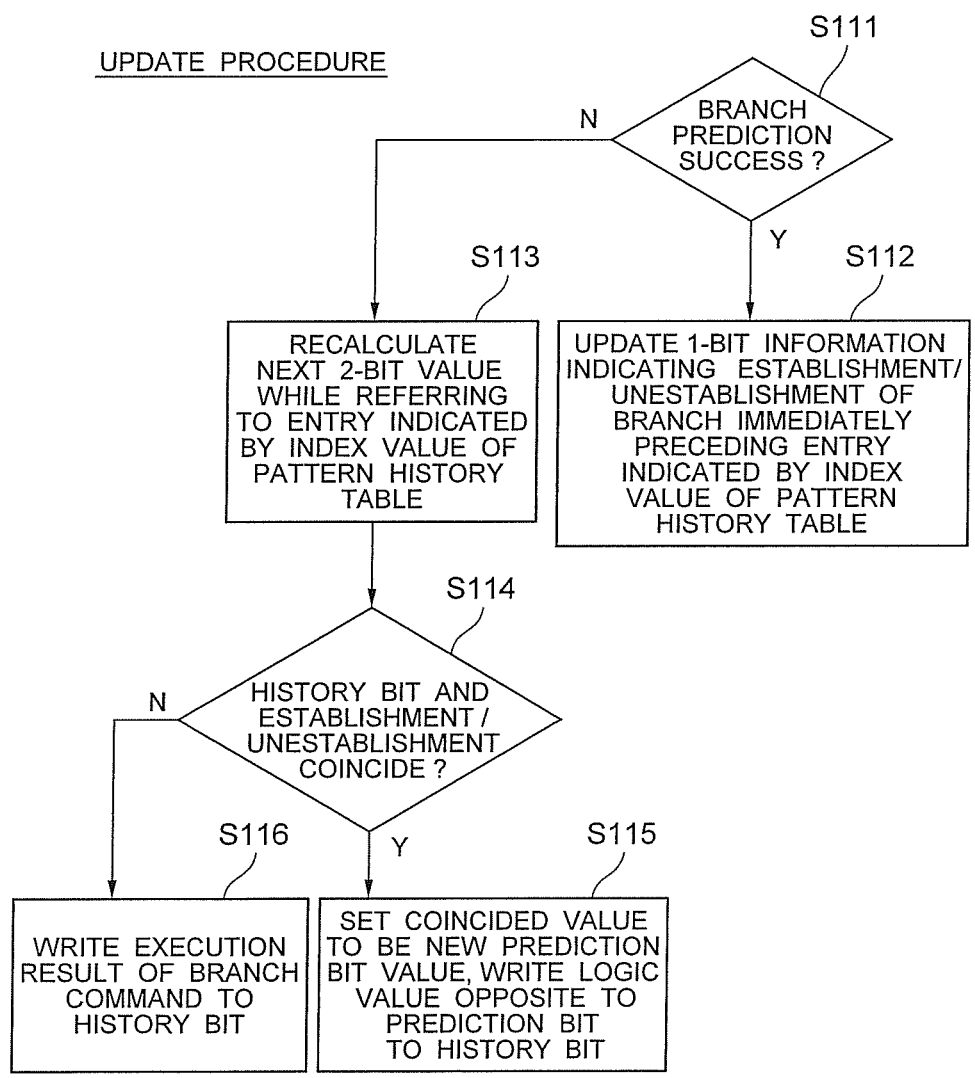
FIG. 8 illustrates an update procedure in the branch prediction device according to the first exemplary embodiment of the invention.

Next, an update procedure will be described with reference to FIG. 8. FIG. 8 illustrates an update procedure in the branch prediction device of the exemplary embodiment.

First, when a branch command reaches the commit stage, the following processing exists. That is, it is determined whether or not the branch prediction is performed successfully (step S111) <branch prediction success determination processing>.

If the branch prediction is performed successfully, processing to update 1-bit information (branch establishment availability information) indicating establishment/unestablishment immediately before the entry indicating the index value of the pattern history table used will be performed (step S112) <branch establishment availability information update processing>.

In contrast, if the branch prediction is failed, processing to recalculate the next 2-bit value will be performed with reference to the entry indicating the index value of the pattern history table used (step S113) <recalculation processing>.

Regarding the value after recalculation, it is determined whether or not establishment/unestablishment coincides with the history bit (step S114) <history bit coincidence determination processing>.

If establishment/unestablishment coincides with the history bit, processing to cause the coincided value after recalculation to be a new value of prediction bit. Here, processing to write a value of logic opposite to the prediction bit into the history bit is performed (step S115) <prediction bit writing processing>.

If establishment/unestablishment does not coincide with the history bit, processing to write the execution result of the branch command into the history bit is performed (step S116) <execution result writing processing>.

With the effective pipeline method, it is possible to improve branch prediction accuracy while performing pipelining.

As described above, according to the exemplary embodiment, by performing processing of row selection, column selection and branch prediction result generation by pipeline processing, it is possible to improve processing speed of an access to the pattern history table to thereby perform processing of branch prediction at a high speed.

Further, as the value of extended-folded-index-register unit is directly input to the row selection logic of the pattern history table, a delay of hash logic can be avoided. Further, with the configuration that an output of the shift register becomes an input of the row selection logic, as the value of the register is directly input to the row selection logic so that the change point of the value of the register is fixed, the extended-folded-index-register unit, which is an example of an index information control section, can accesses the pattern history table through two stages without impairing the branch prediction accuracy.

Further, as calculation of the index information by the extended-folded-index-register unit as an index information control section is performed while considering the execution path history information, the branch prediction accuracy is improved without introducing complicated hash logic.

Further, regarding the value of index information for selecting the branch prediction information of the branch prediction information accumulation processing section or the branch prediction group, the index information control section calculates in advance, in one period of branch prediction generation pipeline for performing the pipeline processing regarding branch prediction generation, the value of index information in another period to be executed after the one period, to thereby supply index information required for each processing in each period of the branch prediction generation pipeline. Then, based on the value of index information corresponding to the one period calculated by the index information control section, the first selection control section performs the first selection control processing by row selection. Further, based on the value of index information corresponding to the other period calculated by the index information control section, the second selection control section performs the second selection control processing to branch prediction of the same branch command by column selection in the other period different from the one period during which the first selection control processing is performed. Thereby, calculation processing can be performed by using the index information beforehand.

Further, as a delay in branch prediction processing will never enter the critical path of the processor, it is possible to provide a branch prediction device capable of contributing to an improvement in the processing speed of the entire processor.

As described above, as there is no hash logic immediately before the branch prediction information accumulation processing section, a delay is branch prediction can be prevented. Further, as the pipeline access control section performs access processing to the branch prediction information accumulation processing section by pipeline processing in two stages of the first selection control processing and the second selection control processing, a higher processing speed in branch prediction can be realized, and the performance of the branch prediction device is improved.

Further, even if the bit number of index information is increased in order to improve the prediction accuracy, with pipeline processing in two stages of row selection and column selection, no delay is caused in the processing speed.

Second Exemplary Embodiment

Figure 9:
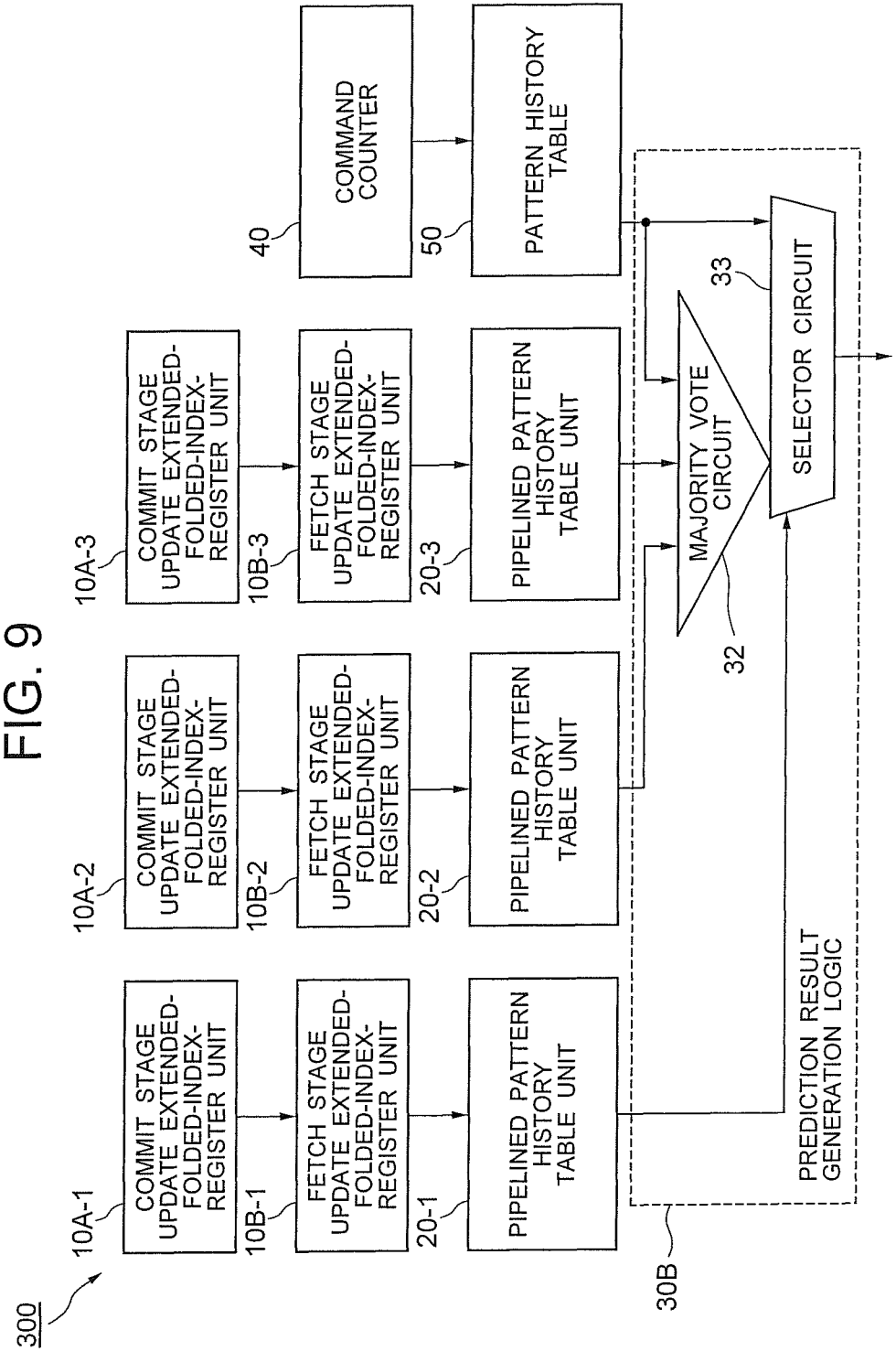
FIG. 9 is a block diagram showing an example of the overall configuration of a branch prediction device (hybrid branch prediction unit) according to a second exemplary embodiment of the invention.

Next, a second exemplary embodiment of the invention will be described based on FIG. 9. Hereinafter, description of the substantially same configurations as those of the first exemplary embodiment is omitted, and only the different sections are described. FIG. 9 is a block diagram showing an example of the second exemplary embodiment in which the branch prediction device of the present invention is applied to a hybrid branch prediction device.

The second exemplary embodiment discloses an example in which the branch prediction device of the first exemplary embodiment is applied to the hybrid branch prediction device. The branch prediction device shown in FIG. 2 is used as a part of a hybrid branch prediction device as shown in FIG. 8.

Figure 10:
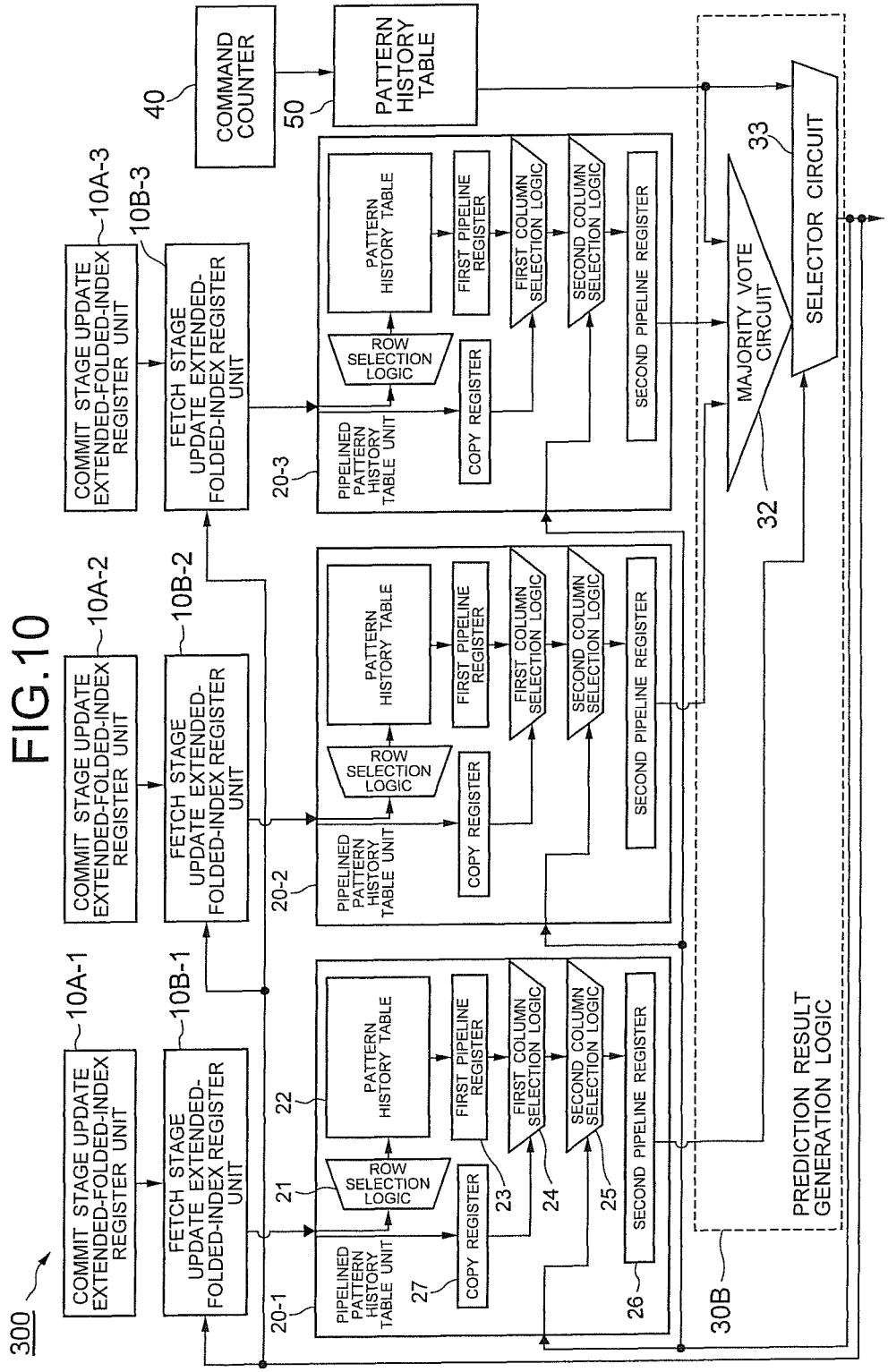
FIG. 10 is a block diagram showing an example of the detailed configuration of the branch prediction device of FIG. 9.

The hybrid branch prediction device according to the exemplary embodiment includes, as the basic configuration, a pipelined branch history information accumulation processing unit (e.g., indicated by a reference numeral 20-1 in FIG. 10) including a branch prediction information accumulation processing section which stores branch prediction groups in which branch prediction information (information indicating a prediction of branching or not branching) regarding a branch command and branch establishment availability information indicating availability of establishment (established/unestablished) of branch immediately before are in groups and accumulation-processes the branch prediction information, and capable of accessing through pipeline processing to the branch prediction information accumulation processing section; a first index information control unit (e.g., indicated by a reference numeral 10B-1 in FIG. 10) for controlling an access by the pipeline processing by index information for selecting the branch prediction information or the branch prediction group and performing processing in a fetch stage of the processor pipeline, and a second index information control unit (e.g., indicated by a reference numeral 10A-1 in FIG. 10) for controlling the index information and performing processing in a commit stage of the processor pipeline.

The pipeline branch prediction information accumulation processing unit (e.g., a reference numeral 20-1 in FIG. 10) includes a first selection control section (e.g., a reference numeral 21 in FIG. 10) which controls selection of at least one group from the branch prediction groups, a second selection control section (e.g., a configuration formed of those indicated by reference numerals 23, 24, 25, 26, and 27 in FIG. 10) which controls selection of one or a plurality of pieces of branch prediction information from the branch prediction group selected by the first selection control section, and a prediction result generation section (e.g., a reference numeral 30B in FIG. 10) which generates a branch prediction result according to the branch prediction information selected by the second selection control section. It is preferable that the first index information control unit (e.g., a reference numeral 10B-1 in FIG. 10) controls pipeline processing including first selection control processing by the first selection control section, second selection control processing by the second selection control section, and prediction result generation processing by the prediction result generation section.

As shown in FIG. 9, the hybrid branch prediction device 300 of the exemplary embodiment includes, as a specific configuration, commit stage update extended-folded-index-register units 10A-1, 10A-2, and 10A-3 which are examples of the second index information control unit to be used for storing rewinding destination, fetch stage update extended-folded-index-register units 10B-1, 10B-2, and 10B-3 which are examples of the first index information control unit to be used for speculative execution, pipeline pattern history tables 20-1, 20-2, and 20-3 which are examples of the pipeline branch prediction information accumulation processing unit having the same configuration as that shown in FIG. 2, a command counter 40, a pattern history table 50 which is an example of the branch prediction information accumulation processing unit, and a branch result generation logic 30B which is an example of a prediction result generation section that generates a prediction result based on respective outputs of the pipelined pattern history tables 20-1, 20-2, and 20-3 and the pattern history table 50.

In the exemplary embodiment, each of the pipelined pattern history tables 20-1, 20-2, and 20-3 shown in FIG. 9 corresponds to the pipelined pattern history table 20 shown in FIG. 2 of the first exemplary embodiment. As such, the configuration will be that shown in FIG. 10 in detail.

Further, the commit stage update extended-folded-index-register units 10A-1, 10A-2, and 10A-3 for storing rewinding destination shown in FIG. 9 correspond to the extended-folded-index-register unit 10 shown in FIG. 2. Furthermore, the fetch stage update extended-folded-index-register units 10B-1, 10B-2, and 10B-3 for speculative update shown in FIG. 9 correspond to the extended-folded-index-register unit 10 shown in FIG. 2.

The prediction result generation logic 30B includes a majority vote circuit 32 working as a majority vote processing block which determines one output by majority vote based on outputs of the pipelined pattern history tables 20-2 and 20-3 and the pattern history table 50, and a selector circuit 33 working as a branch prediction result selection block which selects one of an output of the majority vote circuit 32, an output of the pattern history table 50, and an output of the pipelined pattern history table 20-1.

Note that delays in the respective paths of 10B-1→20-1→33, 10B-2→20-2→32→33, and 10B-3→20-3→32→33 become almost the same in FIG. 9.

Further, the command counter 40 of one input directly becomes an input of the pattern history table 50. The pattern history table 50 is smaller and has a shorter delay compared with other pattern history tables, and as the delay does not includes a delay such as hash function, this delay will never enter the critical path of the processor.

As extended-folded-index-register units, two types of units are provided including the commit stage update extended-folded-index-register units 10A-1, 10A-2, and 10A-3 for storing winding destinations, and fetch stage update extended-folded-index-register unit 10B-1, 10B-2, and 10B-3 for speculative execution.

The fetch stage update extended-folded-index-register units 10b-1, 10B-2, and 10B-3 for speculative execution perform updating using a command cache index utilized in the fetch stage and an output of the prediction result generation logic.

The commit stage update extended-folded-index-register units 10A-1, 10A-2, and 10A-3 for storing rewinding destinations perform updating at the commit stage using the execution cache index utilized at the time of fetching and the result of the execution stage. If the execution result of the execution stage differs from the prediction result, rewinding of pipeline will be performed at the commit stage.

In rewinding, each of the commit stage update extended-folded-index-register units 10A-1, 10A-2, and 10A-3 for storing rewinding destinations copies the content of each of the commit stage update extended-folded-index-register units 10A-1, 10A-2, and 10A-3 for storing rewinding destinations to each of the fetch stage update extended-folded-index-register units 10B-1, 10B-2, and 10B-3 for speculative execution. Thereby, the correctness of branch prediction is ensured.

The commits stage update extended-folded-index-register units 10A-1, 10A-2, and 10A-3, and the fetch stage update extended-folded-index-register unit 10B-1, 10B-2, and 10B-3 hash branch history of different length, and generate index information of the pipelined pattern history table 20-1, 20-2, and 20-3.

For instance, in a case that the capacity of each of the pipelined pattern history tables 20-1, 20-2, and 20-3 is 512 bytes, in the commits stage update extended-folded-index-register unit 10A-1 and the fetch stage update extended-folded-index-register unit 10B-1, branch history information for immediately preceding four commands and the lower 2 bits of the branch command cache index are used as inputs of hash.

In the commit stage update extended-folded-index-register unit 10A-2 and the fetch stage update extended-folded-index-register unit 10B-2, branch history information of immediately preceding 12 commands and the lower 2 bits of the branch command cache index are used as inputs of hash.

In the commit stage update extended-folded-index-register unit 10A-3 and the fetch stage update extended-folded-index-register unit 10B-3, branch history information of immediately preceding 24 commands and the lower 2 bits of the branch command cache index are used as inputs of hash.

Each of the pipelined pattern history table units 20-1, 20-2, 20-3, and 50 stores 1-bit branch prediction information and 1-bit information indicating establishment/unestablishment of the immediately preceding branch, that is, 2 bits in total.

The branch prediction information read out from the pipelined pattern history table units 20-1, 20-2, and 20-3 and the pattern history table 50 is used as an input to the majority vote circuit 32 and the selector circuit 33.

Note that the fetch stage update extended-folded-index-register unit 10B-1 can be said as a "first index information control unit". This first index information control unit may control processing, by pipeline processing, including first selection control processing by the first selection control section, second selection control processing by the second selection control section, and prediction result generation processing by the prediction result generation section.

Further, the first index information control unit is used for speculative execution in the fetch stage, and is capable of performing a control according to the command cache index used in the fetch stage and the output of the prediction result generation section. Further, each first index information control unit hashes branch histories having different length, and generates index information of the branch prediction information of each of the pipelined branch prediction information storing units. In addition, each first index information control unit may be controlled according to the branch history information for various numbers of commands and the branch command cache index information.

On the other hand, the commit stage update extended-folded-index-register unit 10A-1 can be said as a "second index information control unit". This second index information control unit may control at the commit stage according to the command cache index used in the fetch stage and a result of the execution stage, and when branch prediction by the branch prediction information is failed and rewinding of the processor pipeline is performed, may be used for rewinding destination storing processing at the commit stage.

Further, in the second index information control unit, when the execution result in the execution stage differs from the prediction result and rewinding processing of the processor pipeline processing is performed in the commit stage, processing to copy the index information to the first pipeline control unit can be performed. Further, respective second index information control unit may hash branch histories of different length, and generate index information of branch prediction information of respective pipelined branch prediction information storing unit.

(Update Procedure)

In the update procedure, the following processing exists when a branch command reaches the commit stage. That is, when a branch prediction is performed successfully, one-bit information (branch establishment availability information) indicating establishment/unestablishment of immediately preceding branch of the entry indicated by the index value of the used pattern history table is updated <branch establishment availability information update processing>.

On the other hand, when a branch prediction is failed, the next 2-bit value is recalculated with reference to the entry indicated by the index value of the used pattern history table <recalculation processing>.

Regarding the value after recalculating, if the history bit and establishment/unestablishment coincide, the coincided value is set to be a new prediction bit. At this time, a value of logic opposite to the prediction bit is written into the history bit <prediction bit writing processing>.

If the history bit and establishment/unestablishment doe not coincide, an execution result of the branch command is written into the history bit <execution result writing processing>.

The values of the extended-folded-index-register units 10B-1, 10B-2, and 10B-3 for speculative execution are rewritten by the values of the extended-folded-index-register units 10A-1, 10A-2, and 10A-3 for storing rewinding destinations.

As described above, according to the exemplary embodiment, the present invention can be applied to a hybrid branch prediction device using a plurality of different pattern history tables while achieving operational advantages same as that of the first exemplary embodiment.

Note that in the exemplary embodiment, the prediction result generation logic may be a simple majority vote circuit or a simple select circuit. Further, the exemplary embodiment may use a single pattern history table instead of a plurality of pattern history tables.

Other configurations and other steps and their operational advantages are the same as those in the case of the first exemplary embodiment.

Third Exemplary Embodiment

Figure 11:
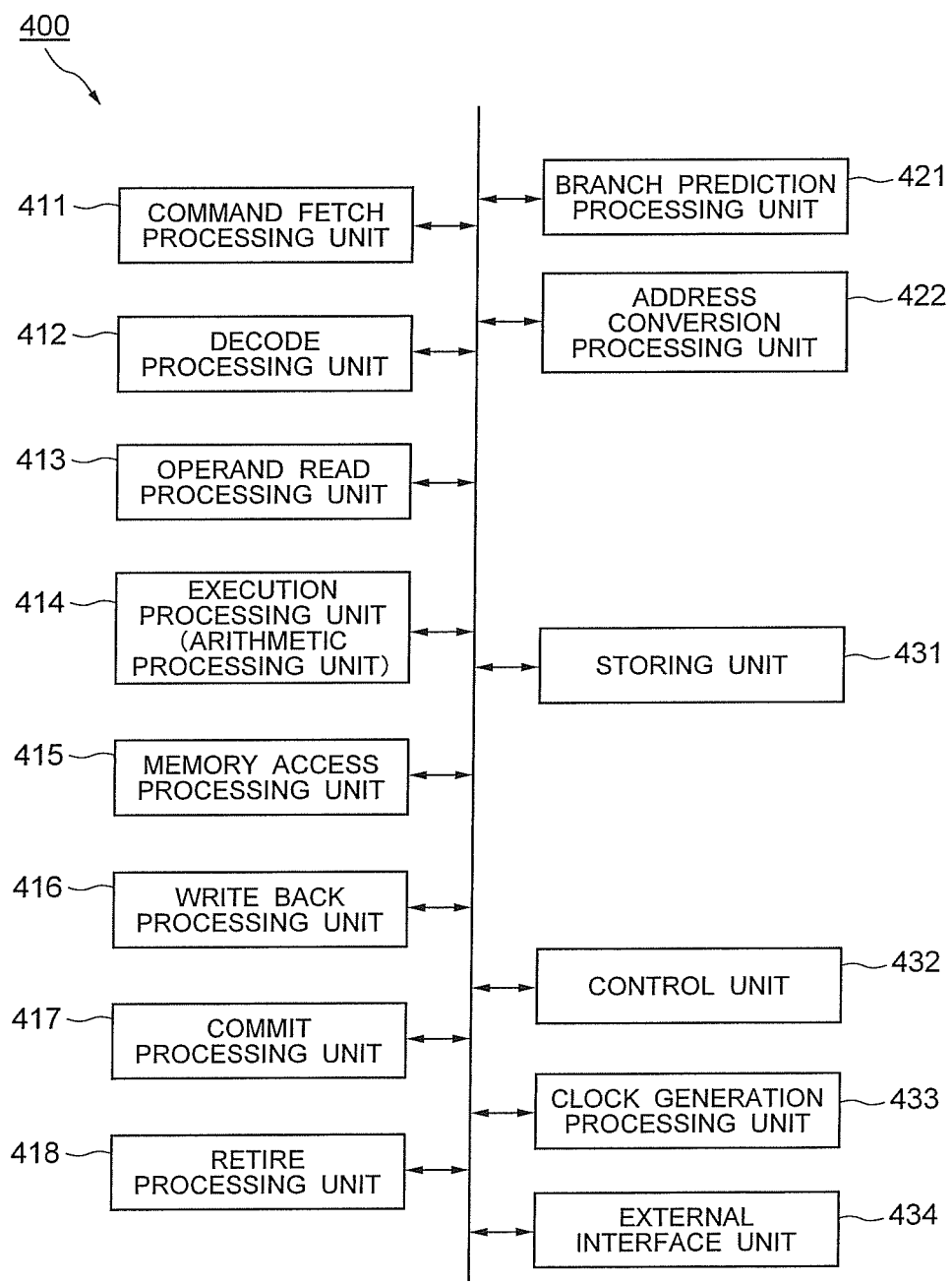
FIG. 11 is a block diagram showing an example of the overall configuration of a processor according to a third exemplary embodiment of the invention.

Next, a third exemplary embodiment of the invention will be described based on FIG. 11. Hereinafter, description of the substantially same configurations as those of the first exemplary embodiment is omitted, and only different components are described. FIG. 11 is a block diagram showing an example of the third exemplary embodiment in which a branch prediction device and a hybrid branch prediction device of the present invention are applied to a processor.

The exemplary embodiment discloses an exemplary processor having the branch prediction device of the first exemplary embodiment or the hybrid branch prediction device of the second exemplary embodiment.

The processor of the exemplary embodiment includes, as the basic configuration, a plurality of processor pipeline processing devices (e.g., reference numerals 411, 412, 413, 414, 415, 416, 417, and 418 in FIG. 11) for executing processor pipeline processing that sequentially moves respective stages according to a command, the branch prediction device of the first exemplary embodiment or the hybrid branch prediction device of the second exemplary embodiment which performs branch prediction of a branch command in the processor pipeline processing, and a control device (e.g., reference numeral 432 in FIG. 1) which controls the respective devices.

The processor 400 of the exemplary embodiment is a pipeline processor which performs pipeline processing. As shown in FIG. 11, the processor 400 includes, as the specific configuration, a command fetch processing unit 411 which performs command fetch processing to fetch a command from a command cache, a decode processing unit 412 which performs decode processing of the order fetched by the command fetch processing unit 411, an operand read processing unit 413 which performs processing to read a register value of register operand (access operand required by the register), an execution processing unit (arithmetic processing unit) 414 which executes a command according to the decode result by the decode processing unit 412 and the register value read by the operand read processing unit 413 (generate a result or a memory address by combining operand), a memory access processing unit 415 which performs processing to read a value of the memory corresponding to the address calculated by the execution processing unit 414 from the data cache (accessing a memory to take data operand as required), a write back processing unit 416 which performs write back processing, a commit processing unit 417 which performs commit processing, a retire processing unit 418 which performs retire processing, and a branch prediction processing unit 421 which is the branch prediction device or the hybrid branch prediction device which is a characteristic configuration of the present invention.

Further, as shown in FIG. 11, the processor 400 includes an address conversion processing unit 422 which performs address conversion processing, a memory unit 431 including respective data storing units required for processing of respective units and respective processing units required for respective types of processing, a control unit 432 which controls respective units performing pipeline processing in the processor, a clock generation processing unit 433 which generates clocks required for respective units, and an external interface unit 434 including various interface functions with other units.

The address conversion processing unit 422 is performed prior to command fetch processing or memory access processing.

In the case of a load/store command, the execution processing unit 414 calculates an execution address. In the case of a branch command, the execution processing unit 414 calculates a branch destination address. The execution processing unit 414 includes one or a plurality of ALU (Arithmetic and Logic Units) and one or a plurality of FPU (Floating Point Unit).

As described above, according to the exemplary embodiment, it is possible to configure a processor capable of achieving the same operational advantage as those of the first exemplary embodiment and the second exemplary embodiment, to provide a processor capable of performing branch prediction at a high speed by performing pipelined processing while maintaining the branch prediction accuracy regarding access processing to the pattern history table to thereby realize a higher processing speed.

In the case of a superscalar processor, an out-of-order execution control processing unit, not shown, which performs controls such as out-of-order execution may be provided. An out-of-order execution control processing unit has a function of performing an execution irrespective of the order of the commands for a part such as an "execution" stage of the processor pipeline stages.

Other configurations, other steps and other operational advantages are the same as those of the above-described exemplary embodiments.

(Various Modifications)

Although the device and method according to the present invention have been described according to specific exemplary embodiments, it is possible to modify the exemplary embodiments described in various ways without departing from the scope of the present invention.

For example, the numbers, positions and shapes of the components are not limited to those described in the exemplary embodiments, and can be made to the numbers, positions and shapes preferable in embodying the present invention. More specifically, although the above exemplary embodiment discloses a case including three pipelined pattern history tables, one pattern history table, and three commit stage update extended-folded-index-register units, and three fetch stage update extended-folded-index-register units, the present invention is not limited to those numbers.

Further in the exemplary embodiment, although pattern history table row access processing (A stage), pattern history table column access processing (B stage), branch prediction result generation processing (C stage) are included in access pipeline to the pattern history table, the present invention is not limited to this configuration. A pipeline accessing method including pattern history table column access processing (A stage), pattern history table row access processing (B stage), and branch prediction result generation processing (C stage) may be acceptable.

Figure 12:
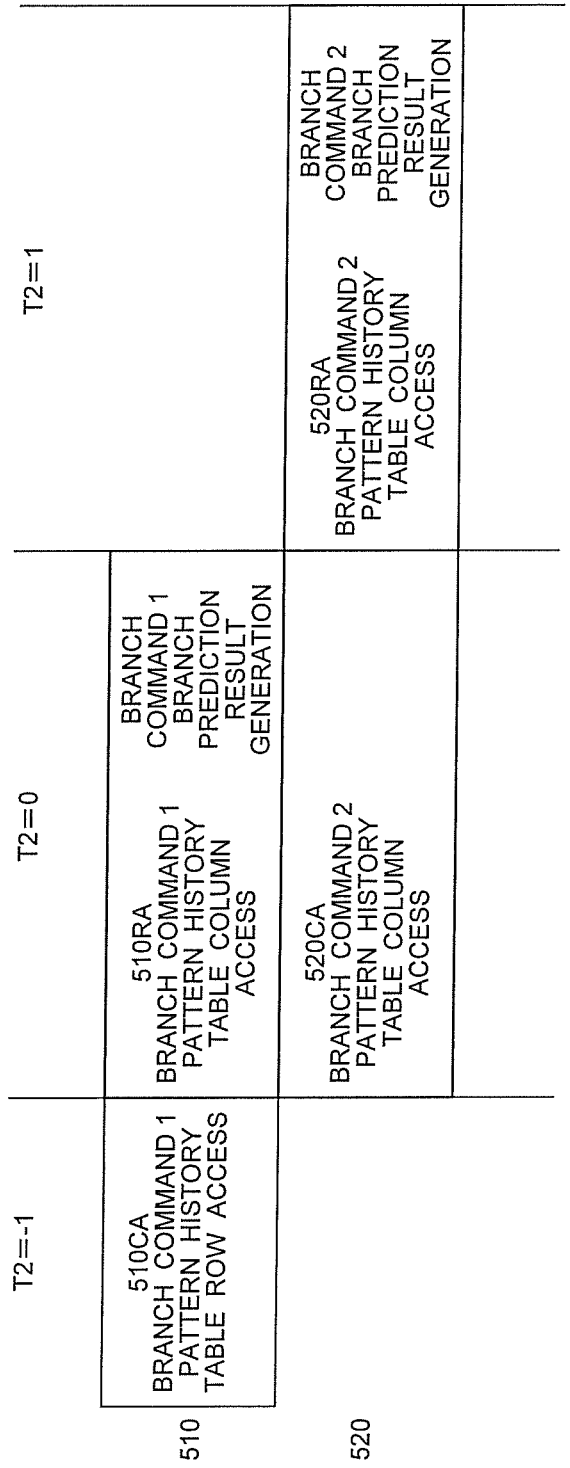
FIG. 12 illustrates a pipeline configuration for accessing pattern history tables in a branch prediction device according to another exemplary embodiment of the invention.
Figure 15:
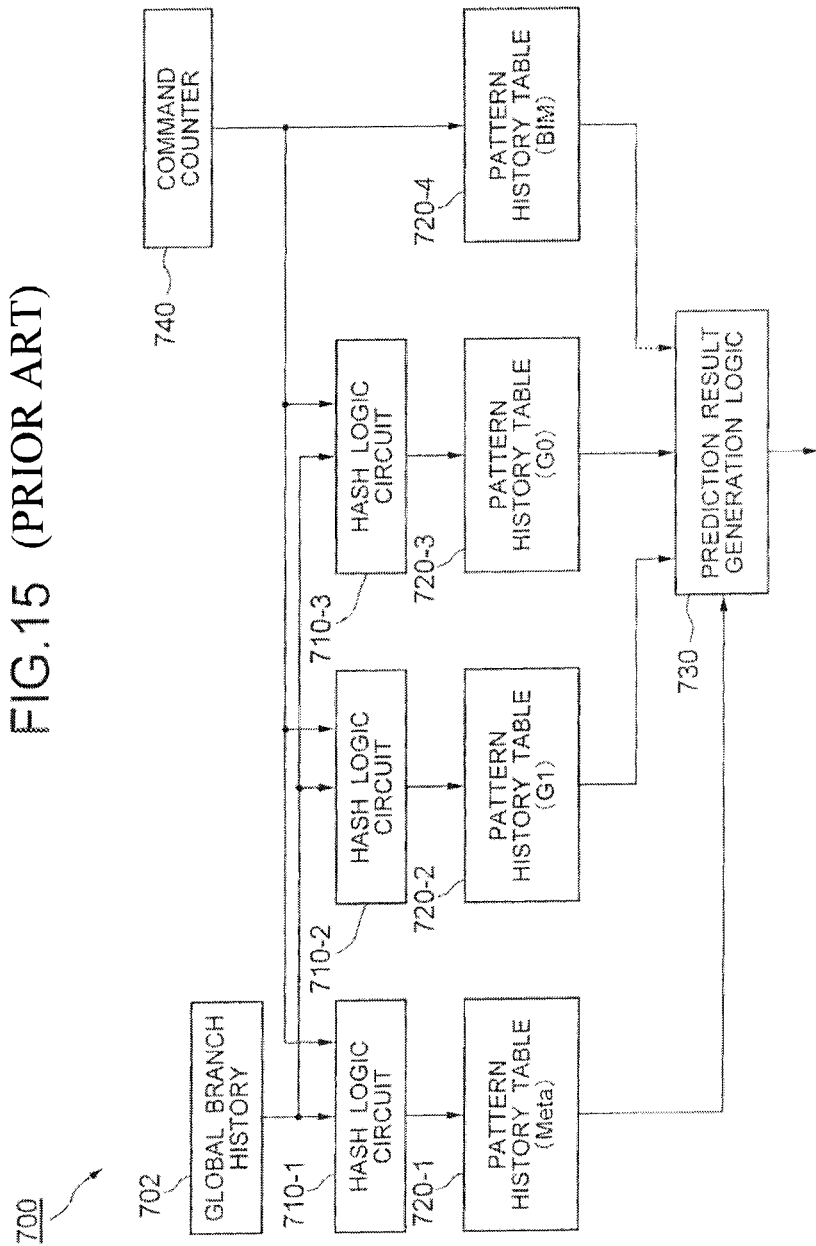
FIG. 15 is a block diagram showing an exemplary configuration of the first related art of a branch prediction device.

Further a pipeline structure in branch prediction is not limited to a three-stage structure as shown in FIGS. 5 and 6, but may be a two-stage pipe line structure as shown in FIG. 12 and a four-stage pipeline structure as shown in FIG. 13.

In the pipeline structure shown in FIG. 12, each of the first branch command 510 and the second branch command 520 has two stages including processing of a stage of performing row selection (e.g., a reference numeral 520CA) and processing of a stage performing column selection and prediction result generation (e.g., a reference numeral 520RA).

Further, in the pipeline structure shown in FIG. 13, each of the first branch command 610, the second branch command 620, the third branch command 630, and the fourth branch command 640 has four stages including processing of a stage of performing row selection (e.g., a reference numeral 640CA), processing of a stage of performing column selection first processing (e.g., a reference numeral 640RAI), processing of a stage of performing column selection second processing (e.g., reference numeral 640RAII), and processing of a stage of performing prediction result generation (e.g., a reference numeral 640G).

In this way, a method of pipeline access processing to the pattern history table is not limited to three-stage pipeline access processing but may be a pipeline structure of three or more stages.

Further, in not only the case of providing a pipeline access control section (first pipeline access control section) for performing processing by pipelining an access to the pattern history tables, but a pipeline access system may be a super pipeline system (second pipeline access processing section) including pattern history table first row access processing, pattern history table second row access processing, pattern history table first column access processing, pattern history table second column access processing, first branch prediction result generation processing, second branch prediction result generation processing, and the like.

Furthermore, a pipeline access system to pattern history tables is not limited to a single scalar system. It may be a superscalar system (third pipeline access processing unit) including a plurality of, for example, two-way parallel processing (processing in which a plurality of types of pipeline processing is operated simultaneously). Specifically, it is acceptable that pattern history table first row access processing and pattern history table second row access processing are performed in the A stage, and pattern history table first column access processing and pattern history table second column access processing are performed in the B stage.

Additionally, a wave pipeline system in which an independent clock is provided in each stage of pipeline access processing is also acceptable (fourth pipeline access processing).

Further, a pattern history table which is an example of a branch prediction information accumulation processing section is not limited to that stores pattern history information in which branch prediction information and branch establishment availability information indicating availability of establishment of the immediately preceding branch. A table storing other various types of information is also acceptable.

Although explanation has been given for the example in which the branch prediction device of the present invention is applied to a hybrid branch prediction device which is resemble to "2bc-gskew type", the present invention may be applied to various hybrid branch prediction devices of other types. For example, the present invention can be applied to all of those performing three or more times (e.g., 4, or 5) of branch prediction and using the majority vote thereof.

Further, the branch prediction method of branch prediction information of a pipelined pattern history table unit having the characteristic configuration of the present invention may be various tables in which various prediction methods are embodied.

Further, as a hybrid branch prediction device, it is also acceptable that various branch prediction devices are combined to predict by majority vote, in addition to a branch prediction device capable of processing pipelining which is the characteristic configuration of the present invention. Further, each branch prediction device capable of performing pipelining in the hybrid branch prediction device may be configured of those performing branch prediction of various types and determine the final prediction result by majority vote.

Further, although an example that the pipeline access control section performs pipeline processing regarding an access of reading processing to read out branch prediction information from the pattern history table has been described in the exemplary embodiment, the pipeline access control section may be configured to perform pipeline processing regarding an access of writing processing.

Further, although the extended-folded-index-register unit is configured so as to update index information according to branch history information and execution path history information, in addition to this feature, the unit may be configured such that the register and the XOR circuit are extended so as to perform update processing while considering other various history information.

Additionally, although the second exemplary embodiment is configured such that two extended-folded-index-register units including a commit stage update extended-folded-index-register unit and a fetch stage update extended-folded-index-register unit are used with respect to one pipelined pattern history table unit, it may be configured to use three or more extended-folded-index-register units having other various functions and common functions.

Furthermore, although it has been described that in selecting a pattern history table in two stages, one branch prediction group is selected by row selection and branch prediction information is selected by column selection, the present invention is no limited to this configuration. A configuration in which one branch prediction group is selected by column selection and branch prediction information is selected by row selection is also acceptable.

Further, in a procedure of reading information of a pattern history table which is an example of a branch prediction information accumulation processing section, not only a case of selecting a branch prediction group by selection one row but a case of selecting a branch prediction group by selecting a plurality of rows simultaneously is also acceptable.

In addition, in the case of selecting a branch prediction group by selecting a plurality of rows simultaneously, a configuration in which a plurality of pieces of branch prediction information is read out from a branch prediction group by selecting one column is also acceptable.

Although, in the above-described exemplary embodiment, a configuration in which a branch prediction device is provided in one processor has been described, a configuration in which a branch prediction device is provided to multiple processor, and a configuration having multiple processors configured of a plurality of processors having branch prediction devices are also acceptable.

Further, as a processor having the branch prediction device or the hybrid branch prediction device of the above-described exemplary embodiments, not only a pipeline processor capable of performing general pipeline processing but also a processor capable of performing superscalar processing or a processor capable of performing super pipeline processing are also acceptable.

Further, a processor may be of a RISC type, a CRISC type in which a CISC command is divided into a plurality of RISC commands within the processor and executed, and a CISC type.

Further, a "processor" is a comprehensive term including a multiprocessor and a dual processor in which a plurality of CPUs are integrated on one chip, in addition to a general processor. As such, a "processor" having a branch prediction device or a hybrid branch prediction device of the exemplary embodiments described above includes a multiprocessor having such a processor, a multiprocessor having such a processor and other various processors, and a dual processor having such a processor.

In this case, a multiprocessor may be of a centralized shared memory type or a distributed shared memory type.

A processor may be of a hardwired type in which a partial function of a controller such as decoding (interpretation of commands) is realized by hardware, or a microcode type in which a partial function of the controller is realized by software.

Further, a processor may be a general-purpose processor or a processor dedicated for specific processing.

Further, regarding the communication structure between a processor having a branch prediction device and another device, the type of an interface formed in any one of them or both may be any interface to be developed in the future.

Further, the steps shown in the respective procedures include not only processing to be performed temporarily according to the described procedures but also processing to be performed in parallel or independently. Further, the order of performing procedures (steps) may be changed. Furthermore, it is also possible to delete, add or rearrange specific procedures (steps) described above as combined procedures (steps), as required.

Further, respective sections, respective functions, respective stages, functions of procedures of respective steps of a device may be achieved by dedicated hardware (e.g., dedicated semiconductor circuit and the like) or may be achieved partially by software. In other words, it is acceptable that a part of the functions is processed by hardware and another part of the functions is processed by software.

In the case of a dedicated hardware, each of the units may be formed by an integrated circuit such as LSI. Each of them may be formed on one chip, or, a part or all of them may be formed on a chip. An LSI may include other functional blocks such as various image processing circuits. Further, a method of realizing an integrated circuit is not limited to LSI. If there appears a technology of integrated circuit which replaces an LSI with advancement of the semiconductor technology or another derived technology, integration of functional blocks may be performed by using such a technology of course.

Further, an approach to perform pipeline processing to an access to a pattern history table is not necessarily limited to a substantial device, and it is easily understandable that the approach works as a method. As such, an invention relating to a method is not necessarily limited to a substantial device. It is also effective as the method. In that case, a branch prediction device and a processor can be included as an example for realizing the method.

Note that such a branch prediction device may be present independently, or may be used in a state of being incorporated in equipment (for example, processor). As such, as a concept of invention, the device may include various aspects. Accordingly, it may be software or hardware, that is, it is changeable appropriately. In the case of software of a branch prediction device as an example of embodying the concept of the invention, it is natural that the device is present on a storage medium storing the software and is used.

In that case, the device may be configured such that a part thereof is software and another part thereof is hardware. The software part may be stored on a storage medium which is read appropriately as required. Further, the operation contents of steps, processing, stages and constitutional elements of units may be produced as programs which are executed by a branch prediction device, a hybrid branch prediction device, or a computer.

In addition, as an electronic device to which the processor and the like is provided, a server is not limited to a personal computer but may include any kind of server, an EWS (engineering work station), a middle-size computer, and a mainframe. As information terminals, in addition to the above-described examples, mobile-type information terminals, various types of mobile terminals, PDA, mobile phones, wearable information terminals, various (e.g., mobile) TV/DVD recorder/audio equipment and their remote controllers, household appliances provided with various information communication functions, and game equipment having network functions.

Further, the above-described exemplary embodiments include various stages, and various inventions can be extracted by appropriate combinations of disclosed constitutional elements, including examples in which above-described exemplary embodiments are combined, or any one of them and any one of modifications are combined. In that case, although not particularly described in the exemplary embodiments herein, operational advantages which are obvious from the configurations disclosed in the exemplary embodiment and their modifications described herein can be included as operational advantages of the exemplary embodiments of course. In contrast, the configurations capable of exhibiting all operational advantages described in the exemplary embodiments herein are not necessarily the indispensable requirements of the essential characteristics of the present invention. Further, exemplary embodiments having configurations in which some constitutional elements are deleted from the all constitutional elements shown in the exemplary embodiments herein and a technical scope according to such configurations may be an invention.

Note that the above description including various exemplary embodiments and modifications thereof are merely shown to disclose examples of various exemplary embodiments of the present invention in order to facilitate understanding of the present invention, that is, to disclose specific examples of realizing the present invention. They are provided only for examples, not for limitation, and appropriate modifications and/or variations are acceptable. The present invention can be realized in various forms according to its technical concept or its main characteristics, and the technical scope of the present invention should not be limited by the exemplary embodiments and their modifications.

As such, the respective elements disclosed above are meant to include all design changes and their equivalents which belong to the technical scope of the present invention.

According to another exemplary embodiment of the invention, a first index information control unit in a hybrid branch prediction device may be used for speculative execution in the fetch stage and configured to perform control according to a command cache index used in the tech stage and an output of the prediction result generation unit.

A second index information control unit in the hybrid branch prediction device according to the other exemplary embodiment of the invention may be configured to perform control in the commit state according to the command cache index used in the fetch stage and a result in the execution stage, and when branch prediction by the branch prediction information is failed and rewinding of the processor pipeline is performed, to be used for rewinding destination storing processing in the commit stage.

The second index information control unit in the hybrid branch prediction device according to the other exemplary embodiment of the invention may be configured, when the execution result in the execution state differs from the prediction result and rewinding processing of the processor pipeline processing is performed in the commit stage, to copy the index information to the first pipeline control unit.

According to the other exemplary embodiment of the invention, the hybrid branch prediction device includes a plurality of the pipelined branch prediction information accumulation processing units, the first index information control units, and the second index information control units, and each of the first index information control units hashes branch history of different length, and generates index information of branch prediction information of each pipelined branch prediction information storing unit.

In the hybrid branch prediction device according to the other exemplary embodiment of the invention, each of the second pipeline control unit hashes a branch history of different length, and generates index information of branch prediction information of each pipelined branch prediction information storing unit.

A processor according to another exemplary embodiment of the invention may include a plurality of processor pipeline processing devices which execute processor pipeline processing in which respective stages are moved sequentially according to an order, a hybrid branch prediction device which performs branch prediction of a branch command in the processor pipeline processing, and a control device which controls the respective devices.

In a branch prediction method according to another exemplary embodiment of the invention, first selection control processing may include row selection processing for controlling selection by a row selection of the branch prediction group. The first selection control processing may include column selection processing for controlling selection by column selection one or a plurality of pieces of branch prediction information, including a first step of performing first row selection processing for selecting a branch prediction group regarding a first branch command in a first period, a second step of performing a first column selection processing for selecting one or a plurality of pieces of branch prediction information regarding the first branch command in a second period after the first period, and a third step of performing first branch prediction result generation processing for generating a branch prediction result regarding the first branch command according to the branch prediction information selected in the first column selection processing regarding the first branch command in a third period after the second period. In the second step, the first column selection processing and the second row selection processing for selecting the branch prediction group regarding a second branch command, which is to be processed following the first branch command, may be performed in parallel. In the third step, the first branch prediction result generation processing, the second column selection processing for selecting one or a plurality of pieces of branch prediction information regarding the second branch command, and the third row selection processing for selecting the branch prediction group regarding a third branch command, which is to be processed following the second branch command, may be performed in parallel.

In the third step, following the third row selection processing, processing to calculate a value of index information of the branch prediction information accumulation processing unit which is to be processed in a fourth step in a fourth period following the third period may be performed in advance according to the first branch prediction result information generated in the first branch prediction result generation processing.

In the third step, processing to extract a value of index information for third column selection processing to be processed in the fourth period and store in a specific column selection information temporary storing unit may be performed based on the calculated value of the index information.

In the third step, processing to store the calculated value of the index information as a value of index information for fourth row selection processing to be processed in the fourth period may be performed.

The fourth step may include: second branch prediction result generation processing for generating second branch prediction result information to be generated regarding the second branch command; third column selection first processing for selecting at least two pieces of branch prediction information according to any one of the branch prediction groups selected from the branch prediction groups in the third row selection processing and a value of the column selection information temporary storing unit; and third column selection second processing for selecting one branch from the branch prediction information selected in the third column selection first processing according to the second branch prediction result information generated in the second branch prediction result generation processing.

As described above, according to the exemplary embodiments of the invention, as no hash logic circuit is provided immediately before the branch prediction information accumulation processing unit, a delay in branch prediction can be prevented. Further, as the pipeline access control unit performs access processing to the branch prediction information accumulation processing unit by pipeline processing through two stages including the first selection control processing and the second selection control processing, a higher processing speed can be achieved in branch prediction, which improves the performance of the branch prediction device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to the fields of computers, semiconductors, manufacturers which manufacture communication devices, and other related field. In more detail, the present invention is applicable to pipelined processors.

What is claimed is:

1. A branch prediction device having a pipeline structure for performing branch prediction based on a global branch history on a computer processor having a pipeline structure, the branch prediction device comprising:
   a branch prediction information accumulation processing section; and
   a pipeline access control section,
   wherein the branch prediction information accumulation processing section includes a pattern history table for storing branch prediction information and branch establish availability information indicating availability of establishment of immediately preceding branching (establishing or not establishing) as branch prediction groups; and
   wherein the pipeline access control section includes:
      an index information control section;
      a first section control section; and
      a second selection control section,
      wherein:
         the index information control section includes an extended-folded-index-register unit and calculates in advance, regarding a value of index information for selecting the branch prediction information or the branch prediction group of the branch prediction information accumulation processing section, in one period of branch prediction generation pipeline for performing the pipeline processing regarding branch prediction generation, a value of the index information in another period to be executed after the one period, supplies index information required for processing in each period of the branch prediction generation pipeline, and causes an output of a shift register configuring the extended-folded-index-register unit to be an input of a row selection by the first selection control section;
         the extended-folded-index-register unit includes:
            a shift register that temporarily stores branch history information for past commands and hash values of the branch command addresses; and
            a logic circuit that includes a function of inputting a hash value of a rewound destination, a function of inputting an object branch command address, a function of inputting an output of a branch prediction logic immediately before, and a function of inputting an output of the shift register, wherein the logic circuit compresses a total bit of the branch history information and an execution path history information using a hash logic to thereby produce index information of the compressed bit;

the first selection control section uses the output of the shift register as the input of the row selection directly, and performs the first selection control processing by row selection according to the value of the index information corresponding to the one period calculated by the index information control section; and the second selection control section performs the second selection control processing by column selection in the other period different from the one period in which the first selection control processing is performed to the branch prediction of the same branch command, according to the value of the index information corresponding to the other period calculated by the index information control section.

2. The branch prediction device, according to claim 1, wherein
the index information control section calculates the value of the index information in the other period according to the branch prediction result which corresponds to another branch command preceding the branch command and is generated by the prediction result generation processing executed in the one period.

3. The branch prediction device, according to claim 1, wherein
the index information control section calculates the value of the index information corresponding to a branch command which is a target of the branch prediction, according to execution path history information regarding information of a path of N pieces of branch commands which have been executed and passed from N preceding branch command to the branch command of the branch prediction target.

4. A branch prediction device having a pipeline structure for performing branch prediction based on a global branch history on a computer processor having a pipeline structure, the branch prediction device comprising:
a branch prediction information accumulation processing means; and
a pipeline access control means,
wherein the branch prediction information accumulation processing means includes a pattern history table for storing branch prediction information and branch establish availability information indicating availability of establishment of immediately preceding branching (establishing or not establishing) as branch prediction groups; and
wherein the pipeline access control means includes:
an index information control means;
a first section control means; and
a second selection control means,
wherein:
the index information control means includes an extended-folded-index-register means and calculates in advance, regarding a value of index information for selecting the branch prediction information or the branch prediction group of the branch prediction information accumulation processing section, in one period of branch prediction generation pipeline for performing the pipeline processing regarding branch prediction generation, a value of the index information in another period to be executed after the one period, supplies index information required for processing in each period of the branch prediction generation pipeline, and causes an output of a shift register means configuring the extended-folded-index-register means to be an input of a row selection by the first selection control means;

the extended-folded-index-register means includes:
a shift register means that temporarily stores branch history information for past commands and hash values of the branch command addresses; and
a logic circuit means that includes a function of inputting a hash value of a rewound destination, a function of inputting an object branch command address, a function of inputting an output of a branch prediction logic immediately before, and a function of inputting an output of the shift register, wherein the logic circuit means compresses a total bit of the branch history information and an execution path history information using a hash logic to thereby produce index information of the compressed bit;

the first selection control means uses the output of the shift register means as the input of the row selection directly, and performs the first selection control processing by row selection according to the value of the index information corresponding to the one period calculated by the index information control means; and the second selection control means performs the second selection control processing by column selection in the other period different from the one period in which the first selection control processing is performed to the branch prediction of the same branch command, according to the value of the index information corresponding to the other period calculated by the index information control means.

5. A computer processor comprising:
a plurality of processor pipeline processing devices for performing processor pipeline processing for sequential transition of stages according to a command;
a branch prediction device having a pipeline structure for performing branch prediction of a branch command in the processor pipeline processing; and
a control device for controlling respective devices, wherein
the branch prediction device includes
a branch prediction information accumulation processing section; and
a pipeline access control section,
wherein the branch prediction information accumulation processing section includes a pattern history table for storing branch prediction information and branch establish availability information indicating availability of establishment of immediately preceding branching (establishing or not establishing) as branch prediction groups, and
wherein the pipeline access control section includes:
an index information control section;
a first section control section; and
a second selection control section, wherein:
the index information control section includes an extended-folded-index-register unit and calculates in advance, regarding a value of index information for selecting the branch prediction information or the branch prediction group of the branch prediction information accumulation processing section, in one period of branch prediction generation pipeline for performing the pipeline processing regarding branch prediction generation, a value of the index information in another period to be executed after the one period, supplies index information required for processing in each period of the branch prediction generation pipeline, and causes an output of a shift register configuring the extended-folded-index-register unit to be an input of a row selection by the first selection control section;

the extended-folded-index-register unit includes:
a shift register that temporarily stores branch history information for past commands and hash values of the branch command addresses; and
a logic circuit that includes a function of inputting a hash value of a rewound destination, a function of inputting an object branch command address, a function of inputting an output of a branch prediction logic immediately before, and a function of inputting an output of the shift register, wherein the logic circuit compresses a total bit of the branch history information and an execution path history information using a hash logic to thereby produce index information of the compressed bit;

the first selection control section uses the output of the shift register as the input of the row selection directly, and performs the first selection control processing by row selection according to the value of the index information corresponding to the one period calculated by the index information control section; and the second selection control section which performs the second selection control processing by column selection in the other period different from the one period in which the first selection control processing is performed to the branch prediction of the same branch command, according to the value of the index information corresponding to the other period calculated by the index information control section.

6. A computer processor comprising:
a plurality of processor pipeline processing means for performing processor pipeline processing for sequential transition of stages according to a command;
a branch prediction means having a pipeline structure for performing branch prediction of a branch command in the processor pipeline processing; and
a control means for controlling respective devices, wherein the branch prediction means includes
a branch prediction information accumulation processing means; and
a pipeline access control means,
wherein the branch prediction information accumulation processing means includes a pattern history table means for storing branch prediction information and branch establish availability information indicating availability of establishment of immediately preceding branching (establishing or not establishing) as branch prediction groups, and wherein the pipeline access control means includes:
an index information control means;
a first section control means; and
a second selection control means,
wherein:
the index information control means includes an extended-folded-index-register means and calculates in advance, regarding a value of index information for selecting the branch prediction information or the branch prediction group of the branch prediction information accumulation processing section, in one period of branch prediction generation pipeline for performing the pipeline processing regarding branch prediction generation, a value of the index information in another period to be executed after the one period, supplies index information required for processing in each period of the branch prediction generation pipeline, and causes an output of a shift register configuring the extended-folded-index-register means to be an input of a row selection by the first selection control section;

the extended-folded-index-register means includes:
a shift register means that temporarily stores branch history information for past commands and hash values of the branch command addresses; and
a logic circuit means that includes a function of inputting a hash value of a rewound destination, a function of inputting an object branch command address, a function of inputting an output of a branch prediction logic immediately before, and a function of inputting an output of the shift register, wherein the logic circuit means compresses a total bit of the branch history information and an execution path history information using a hash logic to thereby produce index information of the compressed bit;

the first selection control means uses the output of the shift register as the input of the row selection directly, and performs the first selection control processing by row selection according to the value of the index information corresponding to the one period calculated by the index information control means; and the second selection control means which performs the second selection control processing by column selection in the other period different from the one period in which the first selection control processing is performed to the branch prediction of the same branch command, according to the value of the index information corresponding to the other period calculated by the index information control means.

7. A computer-implemented branch prediction method in which a branch prediction device having a pipeline structure, which performs branch prediction regarding branch commands, generates a branch prediction result regarding branch commands and performs branch prediction while referring to a branch prediction information accumulation processing section which stores branch prediction groups in which a plurality of pieces of branch prediction information regarding the branch commands are grouped, and performs accumulation-processing of the branch prediction information, the method comprising:
storing, in a pattern history table, branch prediction information and branch establish availability information indicating availability of establishment of immediately preceding branching (establishing or not establishing) as branch prediction groups;

calculating in advance, regarding a value of index information for selecting the branch prediction information or the branch prediction group, in one period of branch prediction generation pipeline for performing the pipeline processing regarding branch prediction generation, a value of the index information in another period to be executed after the one period, supplying index information required for processing in each period of the branch prediction generation pipeline, and causing an output of a shift register configuring an extended-folded-index-register unit to be an input of a row selection;

temporarily storing branch history information for past commands and hash values of the branch command addresses;

inputting a hash value of a rewound destination, inputting an object branch command address, inputting an output of a branch prediction logic immediately before, and inputting an output of the shift register;

compressing a total bit of the branch history information and an execution path history information using a hash logic to thereby produce index information of the compressed bit;

using the output of the shift register as the input of the row selection directly, and performing the first selection control processing by row selection according to the value of the index information corresponding to the calculated one period; and performing the second selection control processing by column selection in the other period different from the one period in which the first selection control processing is performed to the branch prediction of the same branch command, according to the value of the index information corresponding to the calculated other period.

8. A non-transitory computer readable medium storing a branch prediction control program in which a branch prediction device having a pipeline structure, which performs branch prediction regarding branch commands, generates a branch prediction result regarding the branch commands and performs branch prediction while referring to a branch prediction information accumulation processing section which stores branch prediction groups in which a plurality of pieces of branch prediction information regarding branch commands are grouped, and performs accumulation-processing of the branch prediction information, the program causing a computer to execute the functions of:

storing, in a pattern history table, branch prediction information and branch establish availability information indicating availability of establishment of immediately preceding branching (establishing or not establishing) as branch prediction groups;

calculating in advance, regarding a value of index information for selecting the branch prediction information or the branch prediction group, in one period of branch prediction generation pipeline for performing the pipeline processing regarding branch prediction generation, a value of the index information in another period to be executed after the one period, supplying index information required for processing in each period of the branch prediction generation pipeline, and causing an output of a shift register configuring an extended-folded-index-register unit to be an input of a row selection;

temporarily storing branch history information for past commands and hash values of the branch command addresses;

inputting a hash value of a rewound destination, inputting an object branch command address, inputting an output of a branch prediction logic immediately before, and inputting an output of the shift register;

compressing a total bit of the branch history information and an execution path history information using a hash logic to thereby produce index information of the compressed bit;

using the output of the shift register as the input of the row selection directly, and performing the first selection control processing by row selection according to the value of the index information corresponding to the calculated one period; and performing the second selection control processing by column selection in the other period different from the one period in which the first selection control processing is performed to the branch prediction of the same branch command, according to the value of the index information corresponding to the calculated other period.

9. The non-transitory computer readable medium storing a branch prediction control program according to claim 8, which causes the computer to perform a function of calculating a value of the index information in the other period according to the branch prediction result which corresponds to another branch command preceding the branch command and is generated in the prediction result generation processing executed in the one period.

10. The non-transitory computer readable medium storing a branch prediction control program according to claim 9, which causes the computer to perform a function of calculating a value of the index information corresponding to a branch command which is a target of the branch prediction, according to execution path history information regarding information of a path of N pieces of branch commands which have been executed and passed from N preceding branch command to the branch command of the branch prediction target.

* * * * *